United States Patent
Nakaya et al.

(10) Patent No.: US 10,138,321 B2
(45) Date of Patent: Nov. 27, 2018

(54) PROCESS FOR PRODUCTION OF OXYMETHYLENE COPOLYMER

(71) Applicant: MITSUBISHI GAS CHEMICAL COMPANY, INC., Tokyo (JP)

(72) Inventors: Daigo Nakaya, Mie (JP); Toru Takahashi, Tokyo (JP); Satoshi Mochida, Kanagawa (JP); Kensuke Oshima, Tokyo (JP)

(73) Assignee: MITSUBISHI GAS CHEMICAL COMPANY, INC., Tokyo (JP)

( * ) Notice: Subject to any disclaimer, the term of this patent is extended or adjusted under 35 U.S.C. 154(b) by 0 days.

(21) Appl. No.: 15/532,266

(22) PCT Filed: Dec. 1, 2015

(86) PCT No.: PCT/JP2015/083680
§ 371 (c)(1),
(2) Date: Jun. 1, 2017

(87) PCT Pub. No.: WO2016/104065
PCT Pub. Date: Jun. 30, 2016

(65) Prior Publication Data
US 2018/0265617 A1    Sep. 20, 2018

(30) Foreign Application Priority Data
Dec. 25, 2014 (JP) ................... 2014-261838

(51) Int. Cl.
*C08G 2/00*     (2006.01)
*C08G 2/10*     (2006.01)
*C08G 2/28*     (2006.01)

(52) U.S. Cl.
CPC .............. *C08G 2/10* (2013.01); *C08G 2/28* (2013.01)

(58) Field of Classification Search
None
See application file for complete search history.

(56) References Cited

U.S. PATENT DOCUMENTS

| 4,431,794 A | 2/1984 | Sadlowski et al. |
| 4,574,158 A * | 3/1986 | Fenton ................ C07D 323/06 549/347 |
| 5,608,030 A | 3/1997 | Hoffmockel et al. |
| 5,929,257 A * | 7/1999 | Kashihara ............ C07D 323/06 549/368 |
| 2008/0125566 A1* | 5/2008 | Hoffmockel ............. C08G 2/06 528/232 |
| 2013/0018170 A1 | 1/2013 | Hoffmockel |
| 2016/0369050 A1 | 12/2016 | Nakaya et al. |

FOREIGN PATENT DOCUMENTS

| JP | 58-98322 | 6/1983 |
| JP | 7-90037 | 4/1995 |
| JP | 8-325341 | 12/1996 |
| JP | 10-182772 | 7/1998 |
| JP | 2008-195777 | 8/2008 |
| JP | 2009-227894 | 10/2009 |
| JP | 2009-249451 | 10/2009 |
| JP | 2010-504380 | 2/2010 |
| JP | 2011-137087 | 7/2011 |
| JP | 2013-28804 | 2/2013 |
| WO | 2008/034571 | 3/2008 |
| WO | 2015/002147 | 1/2015 |

OTHER PUBLICATIONS

Diaion PK216 material safety data sheet, downloaded Aug. 9 2018. (Year: 2018).*
U.S. Appl. No. 14/901,783, filed Dec. 29, 2015, Nakaya et al.
International Search Report issued in Patent Application No. PCT/JP2015/083680, dated Feb. 23, 2016.

* cited by examiner

*Primary Examiner* — Christopher M Rodd
(74) *Attorney, Agent, or Firm* — Greenblum & Bernstein, P.L.C.

(57) ABSTRACT

The invention provides a method for producing an oxymethylene copolymer including a polymerization step for cationically polymerizing trioxane and a comonomer at a polymerization temperature of from 135 to 300° C. in the presence of at least one salt of a protonic acid having a molecular weight of 1,000 or less, and at least one polymerization initiator selected from the group consisting of protonic acids having a molecular weight of 1,000 or less, protonic acid anhydrides having a molecular weight of 1,000 or less, and protonic acid ester compounds having a molecular weight of 1,000 or less; wherein the total concentration of metal components contained in the trioxane and comonomer used in the polymerization step is 300 ppb by mass or less.

24 Claims, No Drawings

PROCESS FOR PRODUCTION OF OXYMETHYLENE COPOLYMER

TECHNICAL FIELD

The present invention relates to a method for producing an oxymethylene copolymer.

BACKGROUND ART

An oxymethylene polymer has excellent mechanical and thermal performance. Particularly, an oxymethylene copolymer has better thermal stability and moldability than an oxymethylene homopolymer, and therefore has been widely used as an engineering plastic. There are a great number of documents concerning the method for producing an oxymethylene copolymer. For example, JP H08-325341 A has a description of a method for producing an oxymethylene copolymer (bulk polymerization method), in which 1,3,5-trioxane (hereinafter, referred to simply as "trioxane") and a comonomer are polymerized at a temperature of 60 to 115° C. in the presence of a polymerization initiator, and the copolymer formed in the polymerization reaction is subjected to crystallization and precipitation.

JP S58-98322 A discloses a continuous method for bulk polymerization of trioxane, comprising subjecting trioxane and a comonomer to bulk polymerization at a temperature of 135 to 300° C. in the presence of a polymerization initiator, characterized in that the monomer and the formed polymer are present in a molten state during the polymerization.

Further, JP H07-90037 A discloses a method in which a polymerization reaction is conducted for a specific period of time using a protonic acid as a polymerization initiator in a cylindrical reactor having a stationary agitating member, and then the polymerization initiator is quickly deactivated, and further the unstable end (hemiacetal end group) is stabilized in the presence of the residual monomers, and the volatile components are removed by evaporation from the reaction mixture, continuously producing an oxymethylene copolymer having a stable end group in a homogeneous phase.

JP 2010-504380 A discloses a heterogeneous polymerization reaction using a cationic polymerization initiator containing a protonic acid and a salt of a protonic acid. JP 2013-28804 A discloses a method for producing an oxymethylene copolymer, in which the oxymethylene copolymer containing residual monomers obtained in a homogeneous molten state is directly fed into a high-temperature hydrolysis mixture containing a protic solvent and subsequently the oxymethylene copolymer is allowed to precipitate, producing a highly stable oxymethylene copolymer.

On the other hand, in International Patent Application Publication No. 2015/002147, the present inventors have disclosed that it has been difficult to produce an oxymethylene copolymer having a high molecular weight by a conventional method for producing an oxymethylene copolymer in which polymerization is conducted while maintaining the molten state from the start to the termination of the polymerization reaction, but, by cationically polymerizing trioxane and a comonomer at a polymerization temperature of from 135 to 300° C. in the presence of at least one salt of a protonic acid having a molecular weight of 1,000 or less, and at least one polymerization initiator selected from the group consisting of protonic acids having a molecular weight of 1,000 or less, protonic acid anhydrides having a molecular weight of 1,000 or less, and protonic acid ester compounds having a molecular weight of 1,000 or less, a polyoxymethylene copolymer having a high molecular weight can be produced in high yield.

CITATION LIST

Patent Literatures

Patent Literature 1: JP H08-325341 A
Patent Literature 2: JP S58-98322 A
Patent Literature 3: JP H07-90037 A
Patent Literature 4: JP 2010-504380 A
Patent Literature 5: JP 2013-28804 A
Patent Literature 6: PCT/JP2014/067426

SUMMARY OF INVENTION

Technical Problem

The formate end group in the oxymethylene copolymer is likely to decompose due to a contact with moisture or high temperature conditions, and thus a decomposition reaction called a zipper decomposition proceeds, causing reduction of the molecular weight which leads to deterioration of the mechanical strength, or causing generation of formaldehyde which is the cause of odor development. For this reason, the amount of the formate end group in the oxymethylene copolymer is desired to be as small as possible. To provide a method for producing an oxymethylene copolymer having a formate end group in a small amount is a target to be attained by a solution polymerization method, but almost no studies have been made on such production by the solution polymerization method.

The generation of formaldehyde from the oxymethylene copolymer causes odor development, and therefore is desired to be as small as possible. Moisture in air causes deterioration of the oxymethylene copolymer to promote generation of formaldehyde. Particularly, in a water-related environment at elevated temperature and high humidity, such as a washstand or a bathroom, deterioration of the oxymethylene copolymer is accelerated, so that the formaldehyde generation amount is further increased. With respect to the production of an oxymethylene copolymer which is unlikely to suffer deterioration and causes formaldehyde generation in a small amount even when used in an environment at elevated temperature and high humidity, almost no studies have been made on both the production by a general bulk polymerization method and the production by a solution polymerization method.

Further, the oxymethylene copolymer generally has a molecular weight distribution having a high molecular-weight component and a low molecular-weight component. When the content of the low molecular-weight component in the oxymethylene copolymer is large, adverse effects are caused, such as a lowering of the mechanical strength of the resultant molded article, and generation of a mold deposit when used in injection molding. Therefore, the content of the low molecular-weight component in the oxymethylene copolymer is desired to be as small as possible. The production of an oxymethylene copolymer containing a low molecular-weight component in a small amount is a target to be attained by a solution polymerization method, but almost no studies have been made on such production by the solution polymerization method.

Accordingly, an object of an embodiment of the present invention is to provide a method which can produce in high yield an oxymethylene copolymer having a formate end group in a small amount.

Another object of the embodiment of the present invention is to provide a method which can produce in high yield an oxymethylene copolymer which is unlikely to suffer deterioration and causes formaldehyde generation in a small amount when being used for a long period of time and used in an environment at elevated temperature and high humidity.

Still another object of the embodiment of the present invention is to provide a method which can produce in high yield an oxymethylene copolymer containing a low molecular-weight component in a small amount.

Solution to Problem

The present inventors have conducted extensive and intensive studies with a view toward solving the above-mentioned problems. As a result, it has been found that the object can be attained by a method for producing an oxymethylene copolymer, which comprises a polymerization step for cationically polymerizing trioxane and a comonomer at a polymerization temperature of from 135 to 300° C. in the presence of at least one salt of a protonic acid having a molecular weight of 1,000 or less, and at least one polymerization initiator selected from the group consisting of protonic acids having a molecular weight of 1,000 or less, protonic acid anhydrides having a molecular weight of 1,000 or less, and protonic acid ester compounds having a molecular weight of 1,000 or less, wherein the polymerization reaction is conducted using the trioxane and comonomer wherein the total concentration of metal components contained in the trioxane and comonomer used in the polymerization step is a specific value or less, and the present invention has been completed.

Specifically, the present invention is directed to a method for producing an oxymethylene copolymer, which comprises a polymerization step for cationically polymerizing trioxane and a comonomer at a polymerization temperature of from 135 to 300° C. in the presence of at least one salt of a protonic acid having a molecular weight of 1,000 or less, and at least one polymerization initiator selected from the group consisting of protonic acids having a molecular weight of 1,000 or less, protonic acid anhydrides having a molecular weight of 1,000 or less, and protonic acid ester compounds having a molecular weight of 1,000 or less, wherein the total concentration of metal components contained in the trioxane and comonomer used in the polymerization step is 300 ppb by mass or less.

Advantageous Effects of Invention

The embodiment of the present invention can provide a method which can produce in high yield an oxymethylene copolymer having a formate end group content of 5.0 μmol or less per gram of the oxymethylene copolymer.

Further, the embodiment of the present invention can provide a method which can produce in high yield an oxymethylene copolymer which is unlikely to suffer deterioration and causes formaldehyde generation in a small amount when being used for a long period of time and used in an environment at elevated temperature and high humidity.

Furthermore, the embodiment of the present invention can provide a method which can produce in high yield an oxymethylene copolymer containing a low molecular-weight component in a small amount such that the oxymethylene copolymer contains 5.0% or less of oxymethylene copolymer having a number average molecular weight of less than 10,000 expressed in terms of polymethyl methacrylate.

DESCRIPTION OF EMBODIMENTS

In the present specification, the term "step" means not only an independent step but also a combination of steps which cannot be distinguished from one another as long as a desired purpose of the steps is achieved. Further, with respect to the amount of the component of the composition, when more than one materials corresponding to the components are present in the composition, the amount of the components in the composition means the total amount of the materials present in the composition unless otherwise specified.

[I-1. Polymerization Step]

The method for producing an oxymethylene copolymer according to the present embodiment comprises a polymerization step for cationically polymerizing trioxane and a comonomer at a polymerization temperature of from 135 to 300° C. in the presence of at least one salt of a protonic acid having a molecular weight of 1,000 or less, and at least one polymerization initiator selected from the group consisting of protonic acids having a molecular weight of 1,000 or less, protonic acid anhydrides having a molecular weight of 1,000 or less, and protonic acid ester compounds having a molecular weight of 1,000 or less, wherein the total concentration of metal components contained in the trioxane and comonomer used in the polymerization step is 300 ppb by mass or less.

By the above-mentioned method for producing an oxymethylene copolymer, an oxymethylene copolymer having a formate end group content of 5.0 μmol or less per gram of the oxymethylene copolymer, an oxymethylene copolymer which is unlikely to suffer deterioration and causes formaldehyde generation in a small amount when being used for a long period of time and used in an environment at elevated temperature and high humidity, or an oxymethylene copolymer containing a low molecular-weight component in a small amount can be produced in high yield by means of a simple and inexpensive production facility for handling a liquid, such as a static mixer, without using special production facilities required for polymerizing, pulverizing, mixing, melting, or transporting a solid material or a powder material, and this is of great industrial significance. Hereinbelow, the present invention will be described in detail.

[I-2. Concentration of Metal Components in the Raw Materials]

It is necessary that the total concentration of metal components contained in the trioxane and comonomer used in the polymerization step be 300 ppb by mass or less. The total concentration of metal components contained in the trioxane and comonomer used in the polymerization step is more preferably 0.2 to 200 ppb by mass, most preferably 0.2 to 150 ppb by mass.

When the total concentration of the metal components is 300 ppb by mass or less, an oxymethylene copolymer having a formate end group content of 5.0 μmol or less per gram of the oxymethylene copolymer and having a high molecular weight can be obtained in high yield.

Further, when the total concentration of the metal components is 300 ppb by mass or less, there can be obtained in high yield an oxymethylene copolymer having a high molecular weight wherein the ratio (B/A ratio) of the formaldehyde generation amount (B) from the oxymethylene copolymer, which has been subjected to heat treatment at a relative humidity of 98% at 80° C. for 24 hours and at a relative humidity of 11% at 80° C. for 3 hours, to the formaldehyde generation amount (A) from the oxymethylene copolymer, which has been subjected to heat treatment at a relative humidity of 11% at 80° C. for 3 hours, is 1.80 or less.

Further, when the total concentration of the metal components is 300 ppb by mass or less, there can be obtained in high yield an oxymethylene copolymer having a high molecular weight wherein the content of the oxymethylene copolymer having a polymethyl methacrylate-converted, number average molecular weight of less than 10,000 in the obtained oxymethylene copolymer is 5.0% or less.

On the other hand, when the total concentration of the metal components is more than 300 ppb by mass, the amount of the formate end group in the obtained oxymethylene copolymer is large, the obtained oxymethylene copolymer is more likely to suffer deterioration to cause formaldehyde generation in a large amount, the content of the low molecular-weight component in the obtained oxymethylene copolymer is large, or the polymerization reaction does not proceed or the polymerization yield is markedly lowered. With respect to the lower limit of the total concentration of the metal components, there is no particular limitation, but the concentration of 0.2 ppb by mass or more can be measured due to the limit of the ability of an analyzer, and the lower limit of 0.2 ppb by mass is considered to be in an industrially controllable range of the concentration.

With respect to the metal components, there is no particular limitation, but examples of metal components include Na, Fe, Cr, Ni, and Mo. The Na component is likely to be contained in, for example, raw material ion-exchanged water used in producing trioxane and a comonomer, such as 1,3-dioxolane, which are raw materials for polymerization reaction. On the other hand, the Fe, Cr, Ni, and Mo components are contained in stainless steel, such as SUS316 or SUS304, which is a material used in a member constituting a production apparatus for trioxane and a comonomer, such as 1,3-dioxolane, which are raw materials for polymerization reaction (for example, a reactor, a distillation column, a storage container, or a pipe), or a production apparatus for the oxymethylene copolymer (for example, a polymerization reactor, or a heater for the raw material trioxane). These metal components may be dissolved when the polymerization reaction raw materials, particularly the polymerization reaction raw materials at a high temperature are in contact with, for example, stainless steel, depending on the surface state of the stainless steel. From this, it is presumed that, in the production of the oxymethylene copolymer, Na ions contained in trioxane and 1,3-dioxolane which are raw materials for polymerization reaction, or metal components dissolved from the material for a production apparatus for trioxane and a comonomer, such as 1,3-dioxolane, or a production apparatus for the oxymethylene copolymer cause inhibition of the polymerization reaction, an increase of the formate end group content in the obtained oxymethylene copolymer, an increase of the formaldehyde generation amount in an environment at elevated temperature and high humidity, or an increase of the low molecular-weight component in the obtained oxymethylene copolymer.

The total concentration of five (5) metal components Na, Fe, Cr, Ni, and Mo contained in the trioxane and comonomer used in the polymerization step is preferably 300 ppb by mass or less, more preferably 0.2 to 200 ppb by mass, most preferably 0.2 to 150 ppb by mass.

Particularly, the total concentration of four (4) metal components Fe, Cr, Ni, and Mo contained in the trioxane and comonomer used in the polymerization step is preferably 110 ppb by mass or less, more preferably 0.2 to 50 ppb by mass, most preferably 0.2 to 20 ppb by mass. The above-mentioned inhibition of the polymerization reaction, increase of the formate end group content in the obtained oxymethylene copolymer, increase of the formaldehyde generation amount in an environment at elevated temperature and high humidity, or increase of the low molecular-weight component in the obtained oxymethylene copolymer is unlikely to occur when passivation of the surface of the above-mentioned stainless steel is satisfactorily made by, for example, heating it in air. Therefore, it is presumed that the dissolution of the Fe, Cr, Ni, and Mo components is likely to occur when passivation of the surface of stainless steel is unsatisfactory.

For meeting the requirement that the total concentration of metal components contained in the trioxane and comonomer used in the polymerization reaction be 300 ppb by mass or less, it is preferred that the stainless steel contained in the member for the production apparatus for the trioxane and comonomer and the production apparatus for the oxymethylene copolymer is subjected to at least one surface treatment selected from the group consisting of a passivation treatment by acid washing, a high-temperature heat treatment, surface polishing, and electropolishing so that the dissolution of Fe, Cr, Ni, and Mo components from the stainless steel becomes as small as possible, reducing the total concentration of the metal components including the other metal components. These surface treatments may be conducted individually or in combination. Especially, it is most preferred that at least the inner surface of stainless steel members for, for example, production facilities, storage facilities, transport pipes, and polymerization facilities for the trioxane and comonomer, with which the trioxane and comonomer are in contact, is washed with an acid, and washed with pure water, and then subjected to high-temperature heat treatment in air at 350° C. for 7 hours because the dissolution of metal components can be suppressed in a relatively short period of time.

[I-3. Trioxane]

With respect to the total concentration of metal components contained in the trioxane used in the polymerization step, there is no particular limitation, but the total concentration of metal components contained in the trioxane is preferably 300 ppb by mass or less, more preferably 0.2 to 200 ppb by mass, most preferably 0.2 to 150 ppb by mass. Especially, the total concentration of five (5) metal components Na, Fe, Cr, Ni, and Mo contained in the trioxane used in the polymerization step is preferably 300 ppb by mass or less, more preferably 0.2 to 200 ppb by mass, most preferably 0.2 to 150 ppb by mass. Particularly, the total concentration of four (4) metal components Fe, Cr, Ni, and Mo contained in the trioxane used in the polymerization step is preferably 110 ppb by mass or less, more preferably 0.2 to 50 ppb by mass, most preferably 0.2 to 20 ppb by mass. This is because when the total concentration of metal components contained in the trioxane is 300 ppb by mass or less, it is easy to meet the requirement that the total concentration of metal components contained in the trioxane and comonomer used in the polymerization step be 300 ppb by mass or less. The trioxane used in the polymerization step means the trioxane used in the polymerization reaction. The trioxane is a trimer of formaldehyde, and, with respect to the method for producing the trioxane, there is no particular limitation, and the unreacted trioxane recovered during the production of the oxymethylene copolymer is included in the trioxane.

The trioxane may contain a stabilizer or may not contain a stabilizer. When the trioxane contains a stabilizer for improving the stability during storage, the trioxane contains, for example, an amine compound, generally in an amount of 0.00001 to 0.003 mmol, preferably 0.00001 to 0.0005 mmol, more preferably 0.00001 to 0.0003 mmol, per mole of the trioxane. When the amount of the amine compound contained is 0.003 mmol or less, adverse effects, such as deactivation of the polymerization initiator, are unlikely to be caused, and, when the amount of the amine compound contained is 0.00001 mmol or more, for example, generation of paraformaldehyde during storage of the trioxane is satisfactorily suppressed.

Examples of amine compounds which can be contained in the trioxane as a stabilizer include primary amines, secondary amines, tertiary amines, alkylated melamines, and hindered amine compounds. These compounds are used alone or in combination. As the primary amine, for example, n-propylamine, isopropylamine, or n-butylamine is preferably used. As the secondary amine, for example, diethylamine, di-n-propylamine, diisopropylamine, di-n-butylamine, piperidine, or morpholine is preferably used. As the tertiary amine, for example, triethylamine, tri-n-propylamine, triisopropylamine, tri-n-butylamine, or triethanolamine is preferably used. As the alkylated melamine, for example, mono-, di-, tri-, tetra-, penta-, or hexamethoxymethylmelamine, which is a methoxymethyl substitution product of melamine, or a mixture thereof is preferably used. As the hindered amine compound, for example, bis(2,2,6,6-tetramethyl-4-piperidinyl) sebacate, bis(1,2,2,6,6-pentamethyl-4-piperidinyl) sebacate, tetrakis(2,2,6,6-tetramethyl-4-piperidinyl) 1,2,3,4-butanetetracarboxylate, poly[[6-(1,1,3,3-tetramethylenebutyl)amino-1,3,5-triazine-2,4-diyl][(2,2,6,6-tetramethyl-4-piperidinyl)imino]hexamethylene[(2,2,6,6-tetramethyl-4-piperidinyl)imino], 1,2,2,6,6,-pentamethylpiperidine, dimethyl succinate.1-(2-hydroxyethyl)-4-hydroxy-2,2,6,6-tetramethylpiperidine polycondensation product, or N,N'-bis(3-aminopropyl)ethylenediamine.2,4-bis[N-butyl-N-(1,2,2,6,6-pentamethyl-4-piperidyl)amino]-1,3,5-triazine condensation product is preferably used. Of these, triethanolamine is most preferably used.

Impurities contained in the trioxane other than the metal components, such as water, formic acid, methanol, formaldehyde, methylal, dioxymethylene dimethyl ether, and trioxymethylene dimethyl ether, are inevitably generated when industrially producing the trioxane, and the total amount of such impurities in the trioxane is preferably 100 ppm by mass or less, more preferably 70 ppm by mass or less, most preferably 50 ppm by mass or less. Especially, the amount of water is preferably 50 ppm by mass or less, more preferably 20 ppm by mass or less, most preferably 10 ppm by mass or less.

[I-4. Comonomer]

The comonomer is a comonomer which gives oxyalkylene units having 2 or more carbon atoms, preferably a comonomer which gives oxyalkylene units having 2 to 6 carbon atoms, especially preferably a comonomer which gives oxyethylene units having 2 carbon atoms. With respect to the comonomer, there is no particular limitation as long as it is a comonomer copolymerizable with trioxane, for example, a cyclic ether, a glycidyl ether compound, or a cyclic formal. Specific examples of comonomers include ethylene oxide, propylene oxide, butylene oxide, styrene oxide, methyl glycidyl ether, ethyl glycidyl ether, phenyl glycidyl ether, 1,3-dioxolane, propylene glycol formal, diethylene glycol formal, triethylene glycol formal, 1,3,5-trioxepane, 1,4-butanediol formal, 1,5-pentanediol formal, and 1,6-hexanediol formal, and at least one member selected from the group consisting of these compounds is used. As the comonomer, at least one member selected from the group consisting of ethylene oxide, 1,3-dioxolane, diethylene glycol formal, and 1,4-butanediol formal is preferably used. From the viewpoint of copolymerizability with trioxane, 1,3-dioxolane is most preferably used.

With respect to the total concentration of metal components contained in the comonomer used in the polymerization step, there is no particular limitation, but the total concentration of metal components contained in the comonomer is preferably 300 ppb by mass or less, more preferably 0.2 to 200 ppb by mass, most preferably 0.2 to 150 ppb by mass. Especially, the total concentration of five (5) metal components Na, Fe, Cr, Ni, and Mo contained in the comonomer used in the polymerization step is preferably 300 ppb by mass or less, more preferably 0.2 to 200 ppb by mass, most preferably 0.2 to 150 ppb by mass. Further, the total concentration of four (4) metal components Fe, Cr, Ni, and Mo contained in the comonomer used in the polymerization step is preferably 110 ppb by mass or less, more preferably 0.2 to 50 ppb by mass, most preferably 0.2 to 20 ppb by mass. This is because when the total concentration of metal components contained in the comonomer is 300 ppb by mass or less, it is easy to meet the requirement that the total concentration of metal components contained in the trioxane and comonomer used in the polymerization step be 300 ppb by mass or less.

The total amount of impurities contained in the comonomer other than the metal components, such as water, formic acid, and formaldehyde, is preferably 1,000 ppm by mass or less, more preferably 200 ppm by mass or less, further preferably 100 ppm by mass or less, most preferably 50 ppm by mass or less.

The amount of the comonomer used is 0.4 to 45% by mass, preferably 1.2 to 12% by mass, most preferably 2.5 to 6% by mass, based on the mass of the trioxane. When the amount of the comonomer used is 45% by mass or less, the polymerization yield and crystallization rate are unlikely to be lowered, and, when the amount of the comonomer used is 0.4% by mass or more, the unstable moiety is reduced.

[I-5. Polymerization Initiator]

The polymerization initiator is a protonic acid which is a cationic polymerization initiator generally used in copolymerization of trioxane and a comonomer, and a protonic acid anhydride or a protonic acid ester compound is also used. With respect to the molecular weight of these compounds, for achieving high-yield production of an oxymethylene copolymer having a high molecular weight, it is necessary that the molecular weight be 1,000 or less. That is, the polymerization initiator is at least one member selected from the group consisting of protonic acids, protonic acid anhydrides, and protonic acid ester compounds having a molecular weight of 1,000 or less.

The molecular weight of the polymerization initiator is 1,000 or less, preferably 800 or less, most preferably 500 or less. The lower limit of the molecular weight of the polymerization initiator is not particularly limited, and is, for example, 20 or more, preferably 36 or more.

Examples of the protonic acids, protonic acid anhydrides, and protonic acid ester compounds include perchloric acid and derivatives thereof, such as perchloric acid, perchloric anhydride, and acetyl perchlorate; alkylsulfonic acids and arylsulfonic acids having an alkyl group or aryl group fluorinated or chlorinated, and anhydrides and ester compounds thereof, such as trifluoromethanesulfonic acid and trifluoromethanesulfonic anhydride; and phosphinic acid and phosphonic acid and derivatives thereof, such as bis(trifluoromethyl)phosphinic acid and trifluoromethylphosphonic acid. These compounds are used alone or in combination. Of these, preferred is at least one member selected from the group consisting of perchloric acid, perfluoroalkylsulfonic acids, and anhydrides and ester compounds thereof. From the viewpoint of production efficiency and from an economic point of view, most preferred is at least one member selected from the group consisting of perchloric acid, perchloric anhydride, and perchloric acid ester compounds.

The amount of the polymerization initiator used (the amount of the polymerization initiator present in the reaction system) is generally within the range of from 0.001 ppm by mass to 10% by mass, preferably within the range of from 0.001 to 500 ppm by mass, more preferably within the range of from 0.01 to 200 ppm by mass, most preferably within the range of from 0.01 to 100 ppm by mass, based on the mass of the trioxane as a main monomer. When the amount of the polymerization initiator used is 10% by mass or less, a lowering of, for example, the molecular weight of the oxymethylene copolymer is unlikely to occur, and, when the amount of the polymerization initiator used is 0.001 ppm by mass or more, a lowering of, for example, the polymerization conversion is unlikely to occur.

The polymerization initiator is added as it is or in the form of a solution to the polymerization reaction raw materials. That is, all or part of the polymerization initiator may be diluted with a solvent and then added to the polymerization reaction raw materials. When the polymerization initiator is added in the form of a solution, with respect to the solvent used for the solution, there is no particular limitation, but examples of solvents include aliphatic hydrocarbon solvents, such as hexane, heptane, and cyclohexane; aromatic hydrocarbon solvents, such as benzene, toluene, and xylene; and ether solvents, such as 1,2-dimethoxyethane, diethylene glycol dimethyl ether, triethylene glycol dimethyl ether, and 1,4-dioxane. Of these, preferred is a solvent which, though not necessarily, has a boiling point at 1 atm of 115° C. or lower. Such a solvent is easily separated by distillation from the formed copolymer and recovered trioxane. Alternatively, part of or all of a comonomer, such as 1,3-dioxolane, may be used as a solvent.

[I-6. Salt of a Protonic Acid]

In the method for producing an oxymethylene copolymer, the above-mentioned polymerization initiator (at least one member selected from the group consisting of protonic acids having a molecular weight of 1,000 or less, protonic acid anhydrides having a molecular weight of 1,000 or less, and protonic acid esters having a molecular weight of 1,000 or less) and a salt of a protonic acid are used in combination. By virtue of this, the molecular weight of the obtained oxymethylene copolymer and the polymerization yield are increased. The reason for this is presumed that, for example, by using the polymerization initiator and the salt of protonic acid in combination, the copolymer being polymerized is prevented from suffering a decomposition reaction, so that the propagation reaction of the copolymer relatively rapidly proceeds. Specifically, it is presumed that the salt of protonic acid is present in a desired position in the vicinity of the active site of the copolymer at a polymerization temperature of, for example, 135° C. or higher to suppress a decomposition reaction generally called back-biting, in which the copolymer is attacked by its own active site.

With respect to the salt of protonic acid, there is no particular limitation as long as it is a salt formed from an alkali component and a protonic acid. The salt of protonic acid is formed from a cation derived from the alkali component and an anion derived from the protonic acid. From the viewpoint of the production efficiency, the salt of protonic acid is preferably a salt formed from at least one alkali component selected from the group consisting of an alkali metal and a compound thereof, an alkaline earth metal and a compound thereof, ammonia, and an amine compound, and a protonic acid, and it is more preferred that the alkali component is at least one member selected from the group consisting of an alkali metal and a compound thereof, and an alkaline earth metal and a compound thereof. That is, the salt of protonic acid is preferably at least one member selected from the group consisting of an alkali metal salt and an alkaline earth metal salt.

The protonic acid constituting the salt of protonic acid is a compound which releases protons, and, for producing an oxymethylene copolymer having a high molecular weight, a protonic acid having a molecular weight of 1,000 or less is used. The molecular weight per mole of the protonic acid is preferably 800 or lower, most preferably 500 or lower. The lower limit of the molecular weight per mole of the protonic acid is not particularly limited, and is, for example, 20 or more, preferably 36 or more. Examples of such protonic acids include inorganic acids, such as sulfuric acid, hydrochloric acid, phosphoric acid, and perchloric acid; and organic acids, such as fluorinated or chlorinated alkylsulfonic acids and arylsulfonic acids. Of these, at least one member selected from the group consisting of perchloric acid and a perfluoroalkylsulfonic acid is more preferred. From the viewpoint of production efficiency and from an economic point of view, perchloric acid is most preferred.

The alkali component constituting the salt together with the protonic acid is preferably at least one member selected from the group consisting of an alkali metal and a compound thereof, an alkaline earth metal and a compound thereof, ammonia, and an amine compound, more preferably at least one member selected from the group consisting of an alkali metal and a compound thereof, and an alkaline earth metal and a compound thereof. The alkali metal includes lithium, sodium, potassium, rubidium, and cesium. The alkaline earth metal means an alkaline earth metal in the broad sense, and includes calcium, strontium, barium, radium, beryllium, and magnesium. The amine compound includes a primary amine, a secondary amine, a tertiary amine, an alkylated melamine, and a hindered amine compound. As the primary amine, for example, n-propylamine, isopropylamine, or n-butylamine is preferably used. As the secondary amine, for example, diethylamine, di-n-propylamine, diisopropylamine, di-n-butylamine, piperidine, or morpholine is preferably used. As the tertiary amine, for example, triethylamine, tri-n-propylamine, triisopropylamine, or tri-n-butylamine is preferably used. As the alkylated melamine, for example, mono-, di-, tri-, tetra-, penta-, or hexamethoxymethylmelamine, which is a methoxymethyl substitution product of melamine, or a mixture thereof is preferably used. As the hindered amine compound, for example, bis(2,2,6,6-tetramethyl-4-piperidinyl) sebacate, bis(1,2,2,6,6-pentamethyl-4-piperidinyl) sebacate, tetrakis(2,2,6,6-tetramethyl-4-piperidinyl) 1,2,3,4-butanetetracarboxylate, poly[[6-(1,1,3,3-tetramethylenebutyl)amino-1,3,5-triazine-2,4-diyl][(2,2,6,6-tetramethyl-4-piperidinyl)imino]hexamethylene[(2,2,6,6-tetramethyl-4-piperidinyl)imino], 1,2,2,6,6,-pentamethylpiperidine, dimethyl succinate-1-(2-hydroxyethyl)-4-hydroxy-2,2,6,6-tetramethylpiperidine polycondensation product, or N,N'-bis(3-aminopropyl)ethylenediamine-2,4-bis[N-butyl-N-(1,2,2,6,6-pentamethyl-4-piperidyl)amino]-1,3,5-triazine condensation product is preferably used.

With respect to the salt of protonic acid, a pure substance, that is, a compound isolated as a salt may be used, or a substance formed in an acid-alkali reaction without being purified may be used. With respect to the alkali component when a substance formed in an acid-alkali reaction without being purified is used, for example, an alkali metal, an alkaline earth metal, ammonia, an amine compound, or a hydroxide, alcoholate, organic acid salt, inorganic acid salt, or oxide of an alkali metal or alkaline earth metal is preferably used.

The amount of the salt of protonic acid used (the amount of the salt of protonic acid present in the reaction system) is generally within the range of from 0.001 ppm by mass to 10% by mass, preferably within the range of from 0.01 ppm by mass to 1% by mass, most preferably within the range of from 0.01 to 100 ppm by mass, based on the mass of the trioxane as a main monomer. When the amount of the salt of protonic acid used is 10% by mass or less, a lowering of, for example, the molecular weight or polymerization yield is unlikely to occur, and, when the amount of the salt of protonic acid used is 0.001 ppm by mass or more, a molecular weight increase effect is obtained.

The salt of protonic acid is added as it is or in the form of a solution or a suspension to the polymerization reaction raw materials. That is, all or part of the salt of protonic acid may be diluted with a solvent and then added to the polymerization reaction raw materials. When the salt of protonic acid is used in the form of a solution or a suspension, with respect to the solvent used for the solution or suspension, there is no particular limitation, and examples of solvents include the solvents mentioned above. Of these, preferred is a solvent which, though not necessarily, has a boiling point at 1 atm of 115° C. or lower. Such a solvent is easily separated by distillation from the formed copolymer and recovered trioxane. Alternatively, part of or all of a monomer or comonomer, such as trioxane or 1,3-dioxolane, may be used as a solvent. Further, the salt of protonic acid may be preliminarily mixed with a polymerization initiator and diluted with the above-mentioned solvent and then added to the polymerization reaction raw materials. It is preferred that all or part of the polymerization initiator and salt of protonic acid is diluted with a solvent having a boiling point at 1 atm of 115° C. or lower. and then added to the polymerization reaction raw materials because a simplified polymerization facility can be used.

With respect to the molar ratio of the polymerization initiator (preferably a protonic acid) to the salt of protonic acid in the present invention, there is no particular limitation. From the viewpoint of the molecular weight of the obtained oxymethylene copolymer and the polymerization yield, the molar ratio of the polymerization initiator to the salt of protonic acid (polymerization initiator/protonic acid salt) is preferably within the range of from 0.0005 to 100, more preferably within the range of from 0.1 to 20, most preferably within the range of from 0.2 to 10.

[I-7. Ketone Compound]

In the method for producing an oxymethylene copolymer of the present invention, it is preferred that, in addition to a polymerization initiator (at least one member selected from the group consisting of protonic acids, protonic acid anhydrides, and protonic acid esters having a molecular weight of 1,000 or less) and a salt of a protonic acid having a molecular weight of 1,000 or less, a ketone compound is further added to conduct a polymerization reaction. That is, it is preferred that a polymerization reaction is conducted in the presence of a polymerization initiator, a salt of a protonic acid having a molecular weight of 1,000 or less, and a ketone compound.

The ketone compound may be any of an aliphatic ketone and an aromatic ketone. As the ketone compound, at least one member selected from the group consisting of acetone, methyl ethyl ketone, methyl-n-propyl ketone, diethyl ketone, 2-hexanone, 3-hexanone, methyl-t-butyl ketone, di-n-propyl ketone, diisopropyl ketone, diisobutyl ketone, di-n-amyl ketone, stearone, chloroacetone, s-dichloroacetone, diacetyl, acetylacetone, mesityl oxide, phorone, cyclohexanone, and benzophenone is preferably used. These ketones can be used alone or in combination. Of these, at least one member selected from the group consisting of acetone, methyl ethyl ketone, methyl-n-propyl ketone, diethyl ketone, 2-hexanone, 3-hexanone, methyl-t-butyl ketone, di-n-propyl ketone, diisopropyl ketone, diisobutyl ketone, di-n-amyl ketone, diacetyl, acetylacetone, cyclohexanone, and benzophenone is more preferred, and acetone is most preferred.

The amount of the ketone compound added (the amount of the ketone compound present in the reaction system) is generally within the range of from 0.001 ppm by mass to 30% by mass, preferably within the range of from 0.01 ppm by mass to 1% by mass, most preferably within the range of from 0.1 ppm by mass to 0.5% by mass, based on the mass of the trioxane as a main monomer. When the amount of the ketone compound added is 30% by mass or less, a lowering of, for example, the molecular weight of the oxymethylene copolymer or the polymerization yield is unlikely to occur, and, when the amount of the ketone compound added is 0.001 ppm by mass or more, an increasing effect for the molecular weight of the oxymethylene copolymer and the polymerization yield is obtained.

When, in addition to the above-mentioned polymerization initiator (at least one member selected from the group consisting of protonic acids having a molecular weight of 1,000 or less, protonic acid anhydrides having a molecular weight of 1,000 or less, and protonic acid esters having a molecular weight of 1,000 or less) and the salt of protonic acid, a ketone compound is used, an increasing effect for the molecular weight of the oxymethylene copolymer and the polymerization yield is effectively achieved even at a higher polymerization temperature, as compared to the effect obtained when the polymerization initiator and the salt of protonic acid are used. The reason for this is presumed that, for example, by using a ketone compound in combination with the polymerization initiator and the salt of protonic acid, the copolymer being polymerized is prevented from suffering a decomposition reaction, so that the propagation reaction of the copolymer relatively rapidly proceeds.

The ketone compound is added as it is or in the form of a solution to the polymerization reaction raw materials. That is, all or part of the ketone compound may be diluted with a solvent and then added to the polymerization reaction raw materials. When the ketone compound is added in the form of a solution, with respect to the solvent used for the solution, there is no particular limitation, and examples of solvents include the solvents mentioned above. Of these, preferred is a solvent which, though not necessarily, has a boiling point at 1 atm of 115° C. or lower. Such a solvent is easily separated by distillation from the formed copolymer and recovered trioxane. Alternatively, part of trioxane, or part of or all of a comonomer, such as 1,3-dioxolane, may be used as a solvent.

When a ketone compound is used in the polymerization reaction, the molar ratio of the polymerization initiator (preferably a protonic acid) to the ketone compound (polymerization initiator/ketone compound) is preferably within the range of from 0.00001 to 10, more preferably within the range of from 0.0001 to 0.2, most preferably within the range of from 0.0002 to 0.02.

The intrinsic viscosity of the oxymethylene copolymer formed is generally controlled to be 0.5 to 5 dl/g. The intrinsic viscosity of the oxymethylene copolymer formed is preferably controlled to be 0.7 to 3.5 dl/g, most preferably 0.8 to 2.5 dl/g.

[I-8. Molecular Weight Modifier]

The polymerization step may be conducted in the presence of a molecular weight modifier. For example, for modifying the molecular weight of the oxymethylene copolymer, a molecular weight modifier can be used in an amount of 0.01 ppm by mass to 10% by mass, preferably 0.1 ppm by mass to 1% by mass, based on the mass of the trioxane. Examples of molecular weight modifiers include carboxylic acids, carboxylic anhydrides, esters, amides, imides, phenolic compounds, and acetal compounds, and preferred is at least one member selected from the group consisting of these compounds. Particularly, at least one member selected from the group consisting of phenol, 2,6-dimethylphenol, methylal, and polyoxymethylene dimethoxide is more preferably used. Most preferred is methylal.

The molecular weight modifier is added as it is or in the form of a solution to the polymerization reaction raw materials. That is, all or part of the molecular weight modifier may be diluted with a solvent and then added to the polymerization reaction raw materials. When the molecular weight modifier is added in the form of a solution, with respect to the solvent used for the solution, there is no particular limitation, and examples of solvents include the solvents mentioned above. Of these, preferred is a solvent which, though not necessarily, has a boiling point at 1 atm of 115° C. or lower. Such a solvent is easily separated by distillation from the formed copolymer and recovered trioxane. Alternatively, part of trioxane, or part of or all of a comonomer, such as 1,3-dioxolane, may be used as a solvent.

[I-9. Conditions for Polymerization Reaction]

The polymerization step is conducted under positive pressure conditions in the polymerizer of at least the vapor pressure or higher, generally at 0.15 to 50 MPa, preferably 0.15 to 20 MPa.

It is necessary that the polymerization temperature in the polymerization step be a temperature at which the formed oxymethylene copolymer can be maintained in a liquid state between the time of adding a polymerization initiator and the time of adding a polymerization terminator, and, specifically, the polymerization temperature is 135 to 300° C. When a ketone compound is not used, the polymerization temperature is preferably within the range of from 140 to 220° C., most preferably within the range of from 140 to 190° C. When a ketone compound is used, the polymerization temperature is preferably within the range of from 140 to 220° C., most preferably within the range of from 140 to 205° C. The polymerization step is conducted while maintaining the above-mentioned polymerization temperature between the time of adding a polymerization initiator and the time of adding a polymerization terminator. When the polymerization temperature is 300° C. or lower, a lowering of the molecular weight of the formed oxymethylene copolymer or the polymerization yield is unlikely to occur. When the polymerization temperature is 135° C. or higher, the formed oxymethylene copolymer is unlikely to be deposited in the form of a solid, enabling production of the oxymethylene copolymer using a simple apparatus for handling the copolymer in the form of a liquid.

When the polymerization is conducted at a temperature at which the formed oxymethylene copolymer can be maintained in a liquid state between the time of adding a polymerization initiator and the time of adding a polymerization terminator, the polymerization reaction is a mild endothermic reaction and hence, the temperature of the polymerization mixture is lowered as the polymerization reaction proceeds unless heat corresponding to the heat of reaction or higher is supplied to the reaction system. In contrast, when the polymerization is conducted at a temperature at which the formed oxymethylene copolymer cannot be maintained in a liquid state between the time of adding a polymerization initiator and the time of adding a polymerization terminator, the heat generated due to heat of crystallization of the copolymer exceeds the heat absorbed by the polymerization reaction and therefore, the temperature of the polymerization mixture is increased as the polymerization proceeds unless heat corresponding to the difference between them or more is removed from the reaction system. Therefore, a marked increase of the internal temperature during the polymerization indicates occurrence of deposition of the copolymer. That is, in the polymerization step, the polymerization reaction is conducted at a satisfactorily high polymerization temperature such that the difference between the highest temperature and the lowest temperature from the time of adding a polymerization initiator to the time of adding a polymerization terminator is kept within less than 20° C. without vigorously removing the heat. By conducting the polymerization reaction at such a polymerization temperature, even when the production of the copolymer is conducted using a simple and inexpensive polymerization facility, such as a static mixer-type reactor, it is possible to prevent problems caused due to deposition of the copolymer during the polymerization reaction.

The period of time between the time of adding a polymerization initiator and the time of adding a polymerization terminator (polymerization time) is generally 0.1 to 20 minutes, preferably 0.4 to 5 minutes. When the polymerization time is 20 minutes or less, depolymerization is unlikely to occur, and, when the polymerization time is 0.1 minute or more, the polymerization yield is improved. The polymerization is conducted under conditions such that the polymerization yield becomes generally 30% or more, more preferably 60% or more.

The polymerization reaction can be a solution polymerization which is conducted in the presence of an inert solvent, but is preferably a non-solvent polymerization which is conducted substantially in the absence of a solvent and which requires no cost for recovery of a solvent. When a solvent is used in the polymerization reaction, with respect to the solvent, there is no particular limitation, and examples of solvents include the solvents mentioned above. Of these, preferred is a solvent which, though not necessarily, has a boiling point at 1 atm of 115° C. or lower. Such a solvent is easily separated by distillation from the formed copolymer and recovered trioxane.

The polymerization reaction can be performed by a method in any of a batch-wise manner and a continuous manner, but a method in a continuous manner is more preferred from an industrial point of view. Examples of apparatuses used in the polymerization reaction include a shell-type reactor, a plow blade mixer, a tube-type reactor, a rest-type reactor, a kneader (for example, a Buss kneader), an extruder having a single- or twin-screw, a dynamic mixer-type reactor, and a static mixer-type reactor. Of these, preferred is a static mixer-type reactor having a static mixing element and having no driving portion. With respect to the static mixing element inside the static mixer-type reactor, there can be preferably used, for example, one which is formed from two types of elements that are rectangular plates twisted at 180 degrees in a clockwise direction and in a counter-clockwise direction, respectively, or one which is formed from lattices in a plate form which cross and mesh with each other.

[I-10. Sterically Hindered Phenol Compound]

In the polymerization step, copolymerization can be conducted in the presence of a sterically hindered phenol compound. When copolymerization is conducted in the presence of a sterically hindered phenol compound, the amount of the sterically hindered phenol compound contained is generally 0.0001 to 2.0% by mass, preferably 0.001 to 0.5% by mass, more preferably 0.002 to 0.1% by mass, based on the mass of the trioxane. When the amount of the sterically hindered phenol compound used is 2.0% by mass or less, a lowering of, for example, the molecular weight of the formed oxymethylene copolymer or the polymerization yield is unlikely to occur. When the amount of the sterically hindered phenol compound used is 0.0001% by mass or more, the formation of an unstable moiety, such as a formate end group structure in the oxymethylene copolymer, is further suppressed, so that adverse effects, such as a lowering of the thermal or hydrolytic stability, are not caused.

The sterically hindered phenol compound as it is or in the form of a solution is added to the polymerization reaction raw materials. When the sterically hindered phenol compound is added in the form of a solution, with respect to the solvent used for the solution, there is no particular limitation, and examples of solvents include the solvents mentioned above. Of these, preferred is a solvent which, though not necessarily, has a boiling point at 1 atm of 115° C. or lower. Such a solvent is easily separated by distillation from the formed oxymethylene copolymer and recovered trioxane. Alternatively, part of trioxane, or part of or all of a comonomer, such as 1,3-dioxolane, may be used as a solvent. For maintaining the activity of the sterically hindered phenol compound during the polymerization reaction, it is desired that the sterically hindered phenol compound as it is or in the form of a solution is added through an inlet of the polymerizer.

Examples of the sterically hindered phenol compounds used in the polymerization step include dibutylhydroxytoluene, triethylene glycol-bis-3-(3-t-butyl-4-hydroxy-5-methylphenyl) propionate, pentaerythrityl-tetrakis-3-(3,5-di-t-butyl-4-hydroxyphenyl) propionate, hexamethylenebis[3-(3,5-di-t-butyl-4-hydroxyphenyl) propionate], 2,2'-methylenebis(6-t-butyl-4-methylphenol), 3,9-bis{2-[3-(3-t-butyl-4-hydroxy-5-methylphenyl)propionyloxy]-1,1-dimethylethyl}-2,4,8,10-tetraoxaspiro[5.5]undecane, N,N'-hexane-1,6-diylbis[3-(3,5-di-t-butyl-4-hydroxyphenyl) propionamide], and 1,6-hexanediyl 3,5-bis(1,1-dimethylethyl)-4-hydroxybenzenepropionate, and preferred is at least one member selected from the group consisting of these compounds. Of these, at least one member selected from the group consisting of triethylene glycol-bis-3-(3-t-butyl-4-hydroxy-5-methylphenyl) propionate, pentaerythrityl-tetrakis-3-(3,5-di-t-butyl-4-hydroxyphenyl) propionate, and 3,9-bis{2-[3-(3-t-butyl-4-hydroxy-5-methylphenyl)propionyloxy]-1,1-dimethylethyl}-2,4,8,10-tetraoxaspiro[5.5] undecane is more preferably used, and triethylene glycol-bis-3-(3-t-butyl-4-hydroxy-5-methylphenyl) propionate is most preferably used.

[II-1. Polymerization Termination Step]

In the polymerization step, termination of the polymerization reaction can be achieved by adding and mixing a polymerization terminator into the polymerization mixture. That is, it is preferred that the method for producing an oxymethylene copolymer further comprises the step of adding a polymerization terminator. The polymerization terminator is generally used in the form of a molten material, a solution, or a suspension. With respect to the mixing method, an apparatus usable in the above-mentioned polymerization reaction is used, and, in the case of a batch-wise manner, a polymerization terminator is added to the polymerizer after a predetermined time, and, in the case of a continuous manner, the polymerization mixture and polymerization terminator are continuously fed to the mixing apparatus. Especially, preferred is a continuously mixing method using a static mixer-type reactor having a static mixing element and having no driving portion. With respect to the static mixing element inside the static mixer-type reactor, there can be preferably used, for example, one which is formed from two types of elements that are rectangular plates twisted at 180 degrees in a clockwise direction and in a counter-clockwise direction, respectively, or one which is formed from lattices in a plate form which cross and mesh with each other.

[II-2. Polymerization Terminator]

Examples of the polymerization terminators include amine compounds, such as primary amines, secondary amines, tertiary amines, alkylated melamines, and hindered amine compounds; trivalent organophosphorus compounds; alkali metal salts, such as hydroxides of an alkali metal and alcoholates of an alkali metal; and alkaline earth metal salts, such as hydroxides of an alkaline earth metal and alcoholates of an alkaline earth metal, and preferred is at least one member selected from the group consisting of these compounds. That is, the polymerization terminator is preferably at least one member selected from the group consisting of amine compounds, hydroxides of an alkali metal, alcoholates of an alkali metal, hydroxides of an alkaline earth metal, and alcoholates of an alkaline earth metal. The polymerization terminators are used alone or in combination.

As the primary amine, for example, n-propylamine, isopropylamine, or n-butylamine is preferably used. As the secondary amine, for example, diethylamine, di-n-propylamine, diisopropylamine, di-n-butylamine, piperidine, or morpholine is preferably used. As the tertiary amine, for example, triethylamine, tri-n-propylamine, triisopropylamine, or tri-n-butylamine is preferably used. As the alkylated melamine, for example, mono-, di-, tri-, tetra-, penta-, or hexamethoxymethylmelamine, which is a methoxymethyl substitution product of melamine, or a mixture thereof is preferably used. As the hindered amine compound, for example, bis(2,2,6,6-tetramethyl-4-piperidinyl) sebacate, bis(1,2,2,6,6-pentamethyl-4-piperidinyl) sebacate, tetrakis (2,2,6,6-tetramethyl-4-piperidinyl) 1,2,3,4-butanetetracarboxylate, poly[[6-(1,1,3,3-tetramethylenebutyl)amino-1,3,5-triazine-2,4-diyl][(2,2,6,6-tetramethyl-4-piperidinyl) imino]hexamethylene[(2,2,6,6-tetramethyl-4-piperidinyl) imino], 1,2,2,6,6,-pentamethylpiperidine, dimethyl succinate.1-(2-hydroxyethyl)-4-hydroxy-2,2,6,6-tetramethylpiperidine polycondensation product, or N,N'-bis(3-aminopropyl)ethylenediamine.2,4-bis[N-butyl-N-(1,2,2,6,6-pentamethyl-4-piperidyl)amino]-1,3,5-triazine condensation product is preferably used. As the hydroxide or alcoholate of an alkali metal or alkaline earth metal, for example, lithium hydroxide, sodium hydroxide, potassium hydroxide, lithium methoxide, sodium methoxide, potassium methoxide, lithium ethoxide, sodium ethoxide, potassium ethoxide, magnesium hydroxide, calcium hydroxide, magnesium methoxide, calcium methoxide, magnesium ethoxide, or calcium ethoxide is preferably used.

Of these, from the viewpoint of facilitating separation of the compound from the monomers when separating the unreacted monomers by evaporation, at least one member selected from the group consisting of a hindered amine compound, an alkylated melamine, a hydroxide of an alkali metal, and an alcoholate of an alkali metal is more preferred. Among the above-mentioned compounds, as the hindered amine compound, more preferred are bis(2,2,6,6-tetramethyl-4-piperidinyl) sebacate, bis(1,2,2,6,6-pentamethyl-4-piperidinyl) sebacate, dimethyl succinate.1-(2-hydroxyethyl)-4-hydroxy-2,2,6,6-tetramethylpiperidine polycondensation product, and N,N'-bis(3-aminopropyl)ethylenediamine.2,4-bis[N-butyl-N-(1,2,2,6,6-pentamethyl-4-piperidyl)amino]-1,3,5-triazine condensation product. As the alkylated melamine, hexamethoxymethylmelamine is more preferred. As the hydroxide or alcoholate of an alkali metal, sodium hydroxide and sodium methoxide are more preferred. Of these, sodium methoxide is most preferred.

Further, a method using an amine compound and a hydroxide or alcoholate of an alkali metal or alkaline earth metal in combination as a polymerization terminator is preferred, because adverse effects can be suppressed, such as discoloration due to an excess alkali metal or alkaline earth metal and a lowering of the molecular weight of the oxymethylene copolymer. Especially, a method using an amine compound and sodium methoxide in combination is most preferred.

The above-mentioned polymerization terminator is used as it is or in the form of a solution or a suspension. That is, all or part of the polymerization terminator may be diluted with a solvent and then used. When the polymerization terminator is used in the form of a solution or a suspension, with respect to the solvent used for the solution or suspension, there is no particular limitation. As the solvent, water, alcohol solvents, and various aliphatic or aromatic organic solvents, such as acetone, methyl ethyl ketone, 1,2-dimethoxyethane, diethylene glycol dimethyl ether, triethylene glycol dimethyl ether, 1,4-dioxane, hexane, cyclohexane, heptane, benzene, toluene, xylene, methylene dichloride, and ethylene dichloride, can be used. Of these, preferred are water, alcohol solvents, and aliphatic or aromatic organic solvents, such as acetone, methyl ethyl ketone, 1,2-dimethoxyethane, diethylene glycol dimethyl ether, triethylene glycol dimethyl ether, 1,4-dioxane, hexane, cyclohexane, heptane, benzene, toluene, and xylene. Of these, preferred is a solvent which, though not necessarily, has a boiling point at 1 atm of 115° C. or lower. Such a solvent is easily separated by distillation from the formed oxymethylene copolymer and recovered trioxane. A monomer or a comonomer, such as trioxane or 1,3-dioxolane, may be used as a solvent for the polymerization terminator. Further, it is preferred that the polymerization terminator is diluted with the separately produced oxymethylene copolymer and then added.

The amount of the polymerization terminator added, relative to the amount of the polymerization initiator used in the polymerization step, is generally within the range of from 0.1 to 100 molar equivalent, preferably within the range of from 1 to 10 molar equivalent, most preferably within the range of from 1 to 2 molar equivalent. When the amount of the polymerization terminator added is 100 molar equivalent or less, discoloration or a lowering of the molecular weight of the oxymethylene copolymer due to decomposition is unlikely to occur. Further, when the amount of the polymerization terminator added is 0.1 molar equivalent or more, a lowering of the molecular weight of the oxymethylene copolymer due to depolymerization is unlikely to occur. The molar equivalent of the polymerization terminator means the molar number of the polymerization terminator required for deactivating 1 mol of the polymerization initiator.

When an amine compound and a hydroxide or alcoholate of an alkali metal or alkaline earth metal are used in combination as a polymerization terminator, the amount of the amine compound used, relative to the amount of the polymerization initiator used in the polymerization step, is generally within the range of from 0.1 to 100 molar equivalent, preferably within the range of from 1 to 50 molar equivalent, most preferably within the range of from 1 to 10. On the other hand, the amount of the hydroxide or alcoholate of alkali metal or alkaline earth metal used is generally within the range of from 0.001 to 50 molar equivalent, preferably within the range of from 0.01 to 5 molar equivalent, most preferably within the range of from 0.1 to 2 molar equivalent. By using 0.1 molar equivalent or more of an amine compound in combination with a hydroxide or alcoholate of an alkali metal or alkaline earth metal, even when the amount of the hydroxide or alcoholate of alkali metal or alkaline earth metal used is reduced to 50 molar equivalent or less, a satisfactory polymerization termination effect is exhibited, and, at the same time, it is possible to suppress adverse effects, such as discoloration due to an excess alkali metal component or alkaline earth metal component, and a lowering of the molecular weight of the oxymethylene copolymer, which are caused when using only a hydroxide or alcoholate of an alkali metal or alkaline earth metal.

[II-3. Termination of the Polymerization Reaction]

Termination of the polymerization reaction is conducted under conditions at a pressure of at least the inside vapor pressure or more, generally at 0.15 to 50 MPa, more preferably 0.15 to 20 MPa. Termination of the polymerization reaction is conducted at a temperature generally within the range of from 130 to 300° C., more preferably within the range of from 135 to 250° C. The time for mixing a polymerization terminator added for deactivating the polymerization initiator is generally 0.1 to 20 minutes, more preferably 1 to 10 minutes.

When the method for producing an oxymethylene copolymer further comprises the step of adding a polymerization terminator, it is preferred that the oxymethylene copolymer is continuously produced using a continuous polymerization apparatus having a static mixer-type continuous polymerizer having a static mixing element inside the polymerizer, and a mixer for the polymerization terminator, wherein the static mixer-type continuous polymerizer and the mixer for the polymerization terminator are connected in series.

[III-1. Thermal Stabilization Step]

The oxymethylene copolymer obtained after termination of the polymerization reaction (hereinafter, referred to also as "polymerization mixture") contains volatile components, such as residual monomers, and formaldehyde and tetraoxane which are decomposition products, generally in an amount of 20 to 40% by mass. Further, this oxymethylene copolymer contains a thermally unstable moiety caused from the hemiacetal end, which generates formaldehyde due to heating, generally in an amount of 10% by mass or less. For removing these components, it is preferred that the method for producing an oxymethylene copolymer further comprises the step of subsequently, using a degassing apparatus, removing at least part of the volatile components and thermally unstable moiety in the form of a gaseous component (thermal stabilization step).

Examples of the degassing apparatuses include a flash pot, a vented extruder having a single- or twin-screw, a horizontal high-viscosity liquid degassing apparatus having a one-shaft or two-shaft agitating blade of a special shape (for example, a spectacle-shaped blade polymerizer, manufactured by Hitachi Plant Technologies, Ltd.), a wiped-film evaporator, a spray dryer, and a strand degassing apparatus, and preferred is at least one member selected from the group consisting of these apparatuses. Of these, degassing apparatuses selected from the group consisting of a flash pot, a vented extruder having a single- or twin-screw, a horizontal high-viscosity liquid degassing apparatus having a one-shaft or two-shaft agitating blade of a special shape, and others are more preferably used individually or a plurality of the degassing apparatuses are more preferably used in combination. Further, for facilitating degassing of the volatile components, a material having a boiling point of 200° C. or lower under atmospheric pressure, such as water, can be charged under pressure into the above degassing apparatus as it is or together with a basic material, such as triethylamine, followed by degassing under a reduced pressure. The volatile component (gaseous component) separated by the degassing apparatus can be liquefied using a pressuring apparatus or a condensing apparatus, or absorbed by an absorbing apparatus, and recycled as such to or purified by, for example, distillation and recycled to the polymerization step.

When the method for producing an oxymethylene copolymer further comprises the step of removing at least part of the volatile components and thermally unstable moiety in the form of a gaseous component, the temperature for the step is, for example, 130 to 300° C., preferably 160 to 250° C. The pressure for the step is, for example, 0.00001 to 50 MPa, preferably 0.0001 to 5 MPa.

Therefore, it is preferred that the method for producing an oxymethylene copolymer further comprises the step of placing the polymerization mixture obtained in the polymerization step in at least one degassing apparatus selected from the group consisting of a flash pot, a vented extruder having a single- or twin-screw, and a horizontal high-viscosity liquid degassing apparatus having a one-shaft or two-shaft agitating blade at a temperature of 130 to 300° C. under a pressure of 0.00001 to 50 MPa to remove at least part of the volatile components and thermally unstable moiety in the form of a gaseous component. Further, it is preferred that the method further comprises the step of liquefying the removed gaseous component and recycling part of or all of the resultant liquefied component to the raw material trioxane. With respect to the method for liquefying the gaseous component, there is no particular limitation, and the method can be appropriately selected from those generally used. For example, the gaseous component can be liquefied by applying a pressure to it.

The volatile components and thermally unstable moiety are removed in the form of a gaseous component from the polymerization mixture by the above-mentioned method, followed by pelletization, so that a moldable oxymethylene copolymer having excellent thermal stability can be obtained.

Further, in the above-mentioned step of removing the volatile components and thermally unstable moiety, or in the step subsequent to the above step, a stabilizer, such as an antioxidant or a heat stabilizer, can be added and mixed using a melt-mixing apparatus generally used in industry, such as an extruder having a single- or twin-screw, a horizontal high-viscosity liquid degassing apparatus having a one-shaft or two-shaft agitating blade of a special shape, or a static mixer.

[III-2. Stabilizer]

Examples of the antioxidants include sterically hindered phenol compounds, such as triethylene glycol-bis-3-(3-t-butyl-4-hydroxy-5-methylphenyl) propionate, pentaerythrityl-tetrakis-3-(3,5-di-t-butyl-4-hydroxyphenyl) propionate, 2,2'-methylenebis(6-t-butyl-4-methylphenol), 3,9-bis{2-[3-(3-t-butyl-4-hydroxy-5-methylphenyl)propionyloxy]-1,1-dimethylethyl}-2,4,8,10-tetraoxaspiro[5.5]undecane, N,N'-hexane-1,6-diylbis[3-(3,5-di-t-butyl-4-hydroxyphenyl) propionamide], and 1,6-hexanediyl3,5-bis(1,1-dimethylethyl)-4-hydroxybenzenepropionate, and preferred is at least one member selected from the group consisting of these compounds.

Examples of the heat stabilizers include organic compounds, for example, triazine compounds, such as melamine, methylolmelamine, benzoguanamine, cyanoguanidine, and N,N-diarylmelamine, polyamide compounds, urea derivatives, and urethane compounds; and inorganic acid salts, hydroxides, and organic acid salts of sodium, potassium, calcium, magnesium, or barium.

Of these, at least one stabilizer selected from the group consisting of a sterically hindered phenol compound and a triazine compound is preferably used, and a combination of triethylene glycol-bis-3-(3-t-butyl-4-hydroxy-5-methylphenyl) propionate and melamine is most preferred. That is, it is preferred that the method for producing an oxymethylene copolymer further comprises the step of adding at least one stabilizer selected from the group consisting of a sterically hindered phenol compound and a triazine compound.

When a stabilizer is added to the oxymethylene copolymer, the amount of the stabilizer added is not particularly limited and can be appropriately selected, for example, according to the purpose. The amount of the stabilizer added is, for example, 0.0001 to 10% by mass, preferably 0.001 to 5% by mass, based on the mass of the oxymethylene copolymer.

The oxymethylene copolymer pellets, which are a final product of the oxymethylene copolymer obtained by the above-described method for producing an oxymethylene copolymer, have an unstable moiety in an amount as small as, for example, 1.5% by mass or less, generally 0.1 to 1.4% by mass, as measured by, for example, a method for measuring a weight loss on heating under a reduced pressure of 10 torr at 240° C. for 2 hours.

With respect to the formate end group content in the oxymethylene copolymer obtained by the above-described method for producing an oxymethylene copolymer, generally, the amount of the formate end group per gram of the oxymethylene copolymer is 5.0 μmol or less, more preferably 4.0 μmol or less, and thus the obtained oxymethylene copolymer has a feature such that it has a small amount of the formate end group.

The formate end group content in the oxymethylene copolymer is measured by the method described in the Examples ($^1$H-NMR method). In the Examples, for the sake of convenience, the formate end group content was measured after the residual monomers and decomposition products were removed subsequent to the polymerization reaction. However, with respect to the timing of the measurement of the formate end group content, there is no particular limitation, and the measurement may be performed after adding a polymerization terminator, after the thermal stabilization step, or after the extrusion molding.

Further, with respect to the oxymethylene copolymer obtained by the above-described method for producing an oxymethylene copolymer, the ratio (B/A ratio) of the formaldehyde generation amount (B) from the oxymethylene copolymer, which has been subjected to heat treatment at a relative humidity of 98% at 80° C. for 24 hours and at a relative humidity of 11% at 80° C. for 3 hours, to the formaldehyde generation amount (A) from the oxymethylene copolymer, which has been subjected to heat treatment at a relative humidity of 11% at 80° C. for 3 hours, is generally 1.80 or less, more preferably 1.50 or less, most preferably 1.40 or less. When the B/A ratio is 1.80 or less, the oxymethylene copolymer is unlikely to suffer deterioration and causes formaldehyde generation in a small amount when being used for a long period of time and used in an environment at elevated temperature and high humidity.

The B/A ratio for the oxymethylene copolymer is measured by the method described in the Examples. In the Examples of the present invention, for the sake of convenience, the B/A ratio was measured using the oxymethylene copolymer which had been subjected to thermal stabilization treatment. However, with respect to the timing of the measurement of the B/A ratio, there is no particular limitation, and the measurement may be performed after adding a polymerization terminator, after the thermal stabilization step, or after the extrusion molding.

Furthermore, the content of the oxymethylene copolymer having a polymethyl methacrylate-converted, number average molecular weight of less than 10,000 in the oxymethylene copolymer obtained by the above-described method for producing an oxymethylene copolymer is generally 5.0% or less, more preferably 4.0% or less, and thus the obtained oxymethylene copolymer has a feature such that it contains a small amount of the low molecular-weight component.

The content of the oxymethylene copolymer having a polymethyl methacrylate-converted, number average molecular weight of less than 10,000 is measured by the method described in the Examples (GPC method). In the Examples of the present invention, for the sake of convenience, the content of the oxymethylene copolymer having a polymethyl methacrylate-converted, number average molecular weight of less than 10,000 was measured using the oxymethylene copolymer which had been subjected to thermal stabilization treatment. However, with respect to the timing of the measurement of the content, there is no particular limitation, and the measurement may be performed after adding a polymerization terminator, after the thermal stabilization step, or after the extrusion molding.

The oxymethylene copolymer obtained by the above-described method for producing an oxymethylene copolymer has desirable properties equivalent to those of the oxymethylene copolymer obtained by a conventional method, and can be used in the same applications as those for the oxymethylene copolymer obtained by a conventional method.

Further, in the oxymethylene copolymer produced by the above-described method for producing an oxymethylene copolymer, an additive, for example, a colorant, a nucleating agent, a plasticizer, a release agent, a fluorescent brightener, an antistatic agent, such as polyethylene glycol or glycerol, or a light stabilizer, such as a benzophenone compound or a hindered amine compound, can be added if desired.

EXAMPLES

Hereinbelow, the present invention will be described with reference to the following Examples and Comparative Examples, which should not be construed as limiting the scope of the present invention. The terms and measurement methods shown in the following Examples and Comparative Examples are described below.

<Measurement of a Concentration of Metal Components Contained in the Trioxane and Comonomer>

About 5 g of a mixture of trioxane and 1,3-dioxolane as a comonomer to be used in the polymerization reaction was placed in a synthetic quartz beaker, 1 ml of 68% by mass nitric acid and 5 ml of ultrapure water were added to the mixture, and the resultant mixture was heated using a hotplate to allow decomposed products to volatilize. One ml of 98% by mass sulfuric acid was added to the resultant mixture, and a cover of quartz watch glass was put on the beaker to perform wet ashing. The mixture was further heated to allow the sulfuric acid to volatilize, then cooled to room temperature, and dissolved in and diluted with a 0.68% by mass aqueous solution of nitric acid to prepare about 200 g of a sample solution. Using an ICP-MS (ICP-MS 7500cx, manufactured by Agilent), a quantitative analysis for metal components in the sample solution was conducted. The total concentration of the Na, Fe, Cr, Ni, and Mo components detected was determined.

<Measurement of a Formate End Group Content>

A formate end group content in the oxymethylene copolymer was quantitatively determined by a $^1$H-NMR spectrum (analyzer: NMR LA-500, manufactured by JEOL LTD.).

1) Preparation of a sample: About 12 mg of the oxymethylene copolymer obtained in each of the Examples and Comparative Examples was accurately weighed and dissolved in 1 g of hexafluoroisopropanol-$d_2$.

2) Analysis: A formate end group content (unit: μmol) per gram of the oxymethylene copolymer was determined from an integration ratio between a peak assigned to a formate end group appearing at around 8.1 ppm and a peak of the principal chain of the oxymethylene copolymer appearing at 4.5 to 5.5 ppm in the NMR chart.

<Measurement of the B/A Ratio>

Using the oxymethylene copolymer which had been subjected to thermal stabilization treatment, the ratio (B/A ratio) of the formaldehyde generation amount (B) from the oxymethylene copolymer, which has been subjected to heat treatment at a relative humidity of 98% at 80° C. for 24 hours and at a relative humidity of 11% at 80° C. for 3 hours, to the formaldehyde generation amount (A) from the oxymethylene copolymer, which has been subjected to heat treatment at a relative humidity of 11% at 80° C. for 3 hours, was measured by the method described below.

1) Thermal Stabilization Treatment 45 g of the oxymethylene copolymer obtained in each of the below-mentioned Examples and Comparative Examples was subjected to vacuum drying under conditions at 3 torr at 60° C. for 2 hours. Then, per 100 parts by mass of the resultant oxymethylene copolymer, 0.1 part by mass of melamine, 0.05 part by mass of magnesium hydroxide (MAGSARAT F, manufactured by Kyowa Chemical Industry Co., Ltd.), and 0.3 part by mass of triethylene glycol-bis-3-(3-t-butyl-4-hydroxy-5-methylphenyl) propionate were added and mixed. The resultant mixture was melt-kneaded using a laboplastomill (Roller mixer R60H, Model 4M150, manufactured by Toyo Seiki Seisaku-Sho, Ltd.) at 30 rpm in a nitrogen gas atmosphere under atmospheric pressure at 220° C. for 20 minutes.

2) Measurement of a Formaldehyde Generation Amount

A formaldehyde generation amount was measured using headspace gas chromatography (HS-GC) (gas chromatography GC-2010 plus, headspace sampler Turbo Matrix 40, manufactured by Shimadzu Corporation).

The oxymethylene copolymer, which had been subjected to thermal stabilization treatment as mentioned above, was subjected to vacuum drying under conditions at 3 torr at 100° C. for 3 hours. Then, the dried copolymer was freeze-ground using liquid nitrogen. The ground copolymer was put through a 60-120 mesh sieve and subjected to any of the two types of heat treatments described below.

(a) Drying was performed under conditions under atmospheric pressure at a relative humidity of 11% at 80° C. for 3 hours (reference treatment).

(b) A high-humidity heat treatment was performed under conditions under atmospheric pressure at a relative humidity of 98% at 80° C. for 24 hours, and then drying was performed under general conditions at a relative humidity of 11% under atmospheric pressure at 80° C. for 3 hours (high-humidity heat treatment).

After being subjected to each treatment, the resultant oxymethylene copolymer was cooled in dry air to room temperature. Then, 1 g of the oxymethylene copolymer was accurately weighed and set on a headspace sampler, the temperature was maintained at 160° C. for 2 hours, and then the formaldehyde concentration in the sampler was measured.

3) Calculation of the B/A Ratio

The ratio (B/A ratio) of the formaldehyde concentration (B) obtained when performing the high-humidity heat treatment mentioned in 2)-(b) above to the formaldehyde concentration (A) obtained when performing the reference treatment mentioned in 2)-(a) above was calculated.

<Measurement of a Content of a Low Molecular-Weight Component in the Oxymethylene Copolymer>

Using the oxymethylene copolymer which had been subjected to thermal stabilization treatment, the content of the oxymethylene copolymer having a number average molecular weight of less than 10,000 expressed in terms of polymethyl methacrylate was measured by the method described below.

1) Thermal Stabilization Treatment 45 g of the oxymethylene copolymer obtained in each of the below-mentioned Examples and Comparative Examples was subjected to vacuum drying under conditions at 3 torr at 60° C. for 2 hours. Then, to 100 parts by mass of the resultant oxymethylene copolymer, 0.1 part by mass of melamine, 0.05 part by mass of magnesium hydroxide (MAGSARAT F, manufactured by Kyowa Chemical Industry Co., Ltd.), and 0.3 part by mass of triethylene glycol-bis-3-(3-t-butyl-4-hydroxy-5-methylphenyl) propionate were added and mixed. The resultant mixture was melt-kneaded using a laboplastomill (Roller mixer R60H, Model 4M150, manufactured by Toyo Seiki Seisaku-Sho, Ltd.) at 30 rpm in a nitrogen gas atmosphere under atmospheric pressure at 220° C. for 20 minutes.

2) Measurement of a Number Average Molecular Weight Distribution

With respect to the oxymethylene copolymer which had been subjected to thermal stabilization treatment as mentioned above, the number average molecular weight distribution was determined by measurement of gel permeation chromatography (GPC) (Shodex GPC-101, manufactured by Showa Denko K.K.) using hexafluoroisopropanol as a solvent and using polymethyl methacrylate (PMMA) as a standard for a calibration curve. From the ratio of the areas in the obtained molecular weight distribution chart, the content of the oxymethylene copolymer having a number average molecular weight of less than 10,000 expressed in terms of polymethyl methacrylate was calculated.

<Preparation of a Polymerization Initiator>

Perchloric acid solution: Immediately before being used, perchloric acid ($HClO_4$; 70% by mass aqueous solution) was diluted with diethylene glycol dimethyl ether to prepare a diethylene glycol dimethyl ether solution of perchloric acid.

Trifluoromethanesulfonic acid solution: Immediately before being used, trifluoromethanesulfonic acid ($CF_3SO_3H$) was diluted with diethylene glycol dimethyl ether to prepare a diethylene glycol dimethyl ether solution of trifluoromethanesulfonic acid.

<Preparation of a Salt of Protonic Acid>

Perchlorate solution: Immediately before the polymerization reaction, sodium methoxide (28% by mass methanol solution) and perchloric acid (70% by mass aqueous solution) were reacted in diethylene glycol dimethyl ether at 25° C. so as to form a salt of the sodium methoxide and perchloric acid in a molar ratio of 1:1 to prepare a diethylene glycol dimethyl ether solution of $NaClO_4$.

Trifluoromethanesulfonate solution: Immediately before the polymerization reaction, triethylamine and trifluoromethanesulfonic acid were reacted in diethylene glycol dimethyl ether at 25° C. so as to form a salt of the triethylamine and trifluoromethanesulfonic acid in a molar ratio of 1:1 to prepare a diethylene glycol dimethyl ether solution of triethylamine trifluoromethanesulfonate (TEAT).

EXAMPLES AND COMPARATIVE EXAMPLES

Example 1

Using, as a polymerization apparatus, a SUS316 autoclave reactor having a heater and a stiffer and having an inner capacity of 500 ml, an oxymethylene copolymer was produced by polymerization in a batch-wise manner. Before being used, the SUS316 autoclave reactor was acid-washed with a 1% by mass aqueous solution of sulfuric acid, and then washed with pure water and acetone and subjected to high-temperature heat treatment in air at 350° C. for 7 hours. The reactor was heated to 80° C., and the interior of the reactor was dried and purged with dry nitrogen gas. Then, 200 g of trioxane (which contained, as a stabilizer, hexamethylene bis[3-(3,5-di-t-butyl-4-hydroxyphenyl)propionate] that is a sterically hindered phenol compound in an amount of 100 ppm by mass, and which contained impurities, such as water, formic acid, and formaldehyde, each in an amount of 20 ppm by mass or less) and 10 g of 1,3-dioxolane as a comonomer were charged into the reactor. The reactor was pressurized to 2.5 MPaG using high-pressure nitrogen gas. While stirring at 150 rpm, the resultant mixture was heated until the internal temperature reached 155° C. A polymerization initiator (in the form of a 3% by mass diethylene glycol dimethyl ether solution) and a salt of a protonic acid (in the form of a 0.5% by mass diethylene glycol dimethyl ether solution) in the respective amounts shown in Table 1, based on the mass of the trioxane, were mixed together immediately before being used, and the mixture was charged into the reactor under pressure using a pump, together with 1 ml of benzene, to initiate a polymerization. In this instance, the concentration of metal components contained in the total of the trioxane and 1,3-dioxolane used in the polymerization before adding the polymerization initiator and the salt of protonic acid was as shown in Table 1. Further, the concentrations of the respective metal components were as shown in Table 3. The internal pressure of the reactor was raised up to 3 to 4 MPaG by the polymerization.

After the polymerization was conducted for 2 minutes, tri-n-butylamine in the form of a diethylene glycol dimethyl ether solution (solution concentration: 5 mmol/ml) in an amount corresponding to twice the mole of the polymerization initiator used was charged into the reactor under pressure using a pump, together with 1 ml of benzene. The resultant mixture was stirred for 5 minutes to terminate the polymerization. The pressure in the reactor was released so as to evaporate the unreacted monomers and decomposition products, to obtain an oxymethylene copolymer. The character "G" in the unit (MPaG) for pressure indicates a gauge pressure.

After the start of the polymerization, the internal temperature was reduced by about 4° C., but thereafter the internal temperature was maintained at 151 to 157° C. The obtained oxymethylene copolymer was pulverized, and the low boiling-point materials were removed therefrom under a reduced pressure. Thereafter, the copolymer was subjected to the formate end group content measurement. The result of the measurement is shown in Table 1.

Example 2

In Example 2, the polymerization was conducted for 2 minutes, then, sodium methoxide ($CH_3ONa$) in the form of a diethylene glycol dimethyl ether solution (solution concentration: 5 mmol/ml) in an amount corresponding to 1.2 times the mole of the polymerization initiator used was charged into the reactor under pressure using a pump, together with 1 ml of benzene. The resultant mixture was stirred for 5 minutes to terminate the polymerization. The concentration of metal components contained in the total of the trioxane and 1,3-dioxolane used in the polymerization before adding the polymerization initiator and the salt of protonic acid was as shown in Table 1. Except for the above, substantially the same procedures as in Example 1 were repeated. After the start of the polymerization, the internal temperature was reduced by 5° C., but thereafter the internal temperature was maintained at 150 to 157° C. The obtained oxymethylene copolymer was pulverized, and the low boiling-point materials were removed therefrom under a reduced pressure. Thereafter, the copolymer was subjected to the formate end group content measurement. The result of the measurement is shown in Table 1.

Examples 3 and 6

In these examples, the internal temperature at the start of the polymerization was changed to 150° C. After the polymerization was conducted for 2 minutes, tri-n-octylamine in the form of a diethylene glycol dimethyl ether solution (solution concentration: 5 mmol/ml) in an amount corresponding to 100 times the mole of the polymerization initiator used was charged into the reactor under pressure using a pump, together with 1 ml of benzene. The resultant mixture was stirred for 5 minutes to terminate the polymerization. The concentration of metal components contained in the total of the trioxane and 1,3-dioxolane used in the polymerization before adding the polymerization initiator and the salt of protonic acid was as shown in Table 1. Except for the above, substantially the same procedure as in Example 1 was repeated. After the start of the polymerization, the internal temperature was reduced by 5° C., but thereafter the internal temperature was maintained at 145 to 152° C. The obtained oxymethylene copolymer was pulverized, and the low boiling-point materials were removed therefrom under a reduced pressure. Thereafter, the copolymer was subjected to the formate end group content measurement. The result of the measurement is shown in Table 1.

Example 4

In Example 4, after the polymerization was conducted for 2 minutes, hexamethoxymethylmelamine (cyme1303) in the form of a diethylene glycol dimethyl ether solution (solution concentration: 5 mmol/ml) in an amount corresponding to 1.5 times the mole of the polymerization initiator used was charged into the reactor under pressure using a pump, together with 1 ml of benzene. The resultant mixture was stirred for 5 minutes to terminate the polymerization. The concentration of metal components contained in the total of the trioxane and 1,3-dioxolane used in the polymerization before adding the polymerization initiator and the salt of protonic acid was as shown in Table 1. Except for the above, substantially the same procedure as in Example 1 was repeated. After the start of the polymerization, the internal temperature was reduced by 3° C., but thereafter the internal temperature was maintained at 152 to 157° C. The obtained oxymethylene copolymer was pulverized, and the low boiling-point materials were removed therefrom under a reduced pressure. Thereafter, the copolymer was subjected to the formate end group content measurement. The result of the measurement is shown in Table 1.

Example 5

In Example 5, the internal temperature at the start of the polymerization was changed to 165° C. A polymerization initiator (in the form of a 3% by mass diethylene glycol dimethyl ether solution) and a salt of a protonic acid (in the form of a 0.5% by mass diethylene glycol dimethyl ether solution) in the respective amounts shown in Table 1, based on the mass of the trioxane, as well as acetone were mixed together immediately before being used. The concentration of metal components contained in the total of the trioxane and 1,3-dioxolane used in the polymerization before adding the polymerization initiator and the salt of protonic acid was as shown in Table 1. Except for the above, substantially the same procedure as in Example 3 was repeated. After the start of the polymerization, the internal temperature was reduced by 4° C., but thereafter the internal temperature was maintained at 161 to 167° C. The obtained oxymethylene copolymer was pulverized, and the low boiling-point materials were removed therefrom under a reduced pressure. Thereafter, the copolymer was subjected to the formate end group content measurement. The result of the measurement is shown in Table 1.

Comparative Example 1

Using, as a polymerization apparatus, a SUS304 bench two-shaft kneader having a jacket, sight glass, and two Z-type blades and having an inner capacity of 1 L, an oxymethylene copolymer was produced by polymerization in a batch-wise manner. The polymerization apparatus was not washed with an acid before being used. Hot water at 70° C. was circulated through the jacket. Further the interior of the apparatus was dried by heating using air at 100° C. for one hour. Then a cover was put on the apparatus and the inside system was purged with nitrogen gas. 300 g of trioxane (which contained, as a stabilizer, hexamethylenebis [3-(3,5-di-t-butyl-4-hydroxyphenyl) propionate] that is a sterically hindered phenol compound in an amount of 100 ppm by mass, and which contained impurities, such as water, formic acid, and formaldehyde, each in an amount of 20 ppm by mass or less) and 12 g of 1,3-dioxolane as a comonomer were charged into the apparatus through a raw material inlet. The resultant mixture was stirred using the Z-type blades. After the internal temperature reached 70° C., a boron trifluoride diethyl ether complex in the form of a benzene solution (solution concentration: 0.6 mmol/ml) in an amount of 77 ppm, based on the mass of the trioxane, was added to initiate a polymerization. In this instance, the total concentration of metal components contained in the total of the trioxane and 1,3-dioxolane used in the polymerization was 500 ppb by mass (Na: 91, Fe: 305, Cr: 72, Ni: 32; unit: ppb by mass). After the polymerization was conducted for 4 minutes, triethylamine in the form of a benzene solution (solution concentration: 5 mmol/ml) in an amount corresponding to 10 times the mole of the polymerization initiator used was added using a syringe to the polymerization apparatus. The resultant mixture was stirred for 15 minutes to terminate the polymerization to obtain an oxymethylene copolymer.

After the start of the polymerization, deposition of the copolymer was visually observed through the sight glass and further the internal temperature was increased to 102° C. The obtained oxymethylene copolymer was pulverized and low boiling-point materials were removed therefrom under a reduced pressure. Thereafter, the copolymer was subjected to a formate end group content measurement. As a result, the formate end group content was found to be 10.7 μmol/g- μmol/g-POM is an abbreviation for polyoxymethylene.

Comparative Example 2

In Comparative Example 2, before being used, the SUS316 autoclave reactor was acid-washed with a 1% by mass aqueous solution of sulfuric acid, and then washed with pure water and acetone and dried in air at 100° C. for one hour. Trioxane and 1,3-dioxolane were used as polymerization raw materials wherein the total concentration of metal components in the trioxane and 1,3-dioxolane was 350 ppb by mass (Na: 234, Fe: 88, Cr: 18, Ni: 8.0, Mo: 2.0; unit: ppb by mass). Except for the above, substantially the same procedure as in Example 1 was repeated. In Comparative Example 2, no oxymethylene copolymer was formed, and the internal temperature was not changed.

Comparative Example 3

In Comparative Example 3, before being used, the SUS316 autoclave reactor was acid-washed with a 1% by mass aqueous solution of sulfuric acid, and then washed with pure water and acetone and dried in air at 100° C. for one hour. Trioxane and 1,3-dioxolane were used as polymerization raw materials wherein the total concentration of metal components in the trioxane and 1,3-dioxolane was 350 ppb by mass (Na: 234, Fe: 88, Cr: 18, Ni: 8.0, Mo: 2.0; unit: ppb by mass). Except for the above, substantially the same procedure as in Example 2 was repeated. In Comparative Example 3, no oxymethylene copolymer was formed, and the internal temperature was not changed.

Comparative Example 4

In Comparative Example 4, before being used, the SUS316 autoclave reactor was acid-washed with a 1% by mass aqueous solution of sulfuric acid, and then washed with pure water and acetone and dried in air at 100° C. for one hour. Trioxane and 1,3-dioxolane were used as polymerization raw materials wherein the total concentration of metal components in the trioxane and 1,3-dioxolane was 350 ppb by mass (Na: 234, Fe: 88, Cr: 18, Ni: 8.0, Mo: 2.0; unit: ppb by mass). Except for the above, substantially the same procedure as in Example 3 was repeated. In Comparative Example 4, no oxymethylene copolymer was formed, and the internal temperature was not changed.

Comparative Example 5

In Comparative Example 5, before being used, the SUS316 autoclave reactor was acid-washed with a 1% by mass aqueous solution of sulfuric acid, and then washed with pure water and acetone and dried in air at 100° C. for one hour. Trioxane and 1,3-dioxolane were used as polymerization raw materials wherein the total concentration of metal components in the trioxane and 1,3-dioxolane was 350 ppb by mass (Na: 234, Fe: 88, Cr: 18, Ni: 8.0, Mo: 2.0; unit: ppb by mass). Except for the above, substantially the same procedure as in Example 4 was repeated. In Comparative Example 5, no oxymethylene copolymer was formed, and the internal temperature was not changed.

Comparative Example 6

In Comparative Example 6, before being used, the SUS316 autoclave reactor was acid-washed with a 1% by mass aqueous solution of sulfuric acid, and then washed with pure water and acetone and dried in air at 100° C. for one hour. Trioxane and 1,3-dioxolane were used as polymerization raw materials wherein the total concentration of metal components in the trioxane and 1,3-dioxolane was 350 ppb by mass (Na: 234, Fe: 88, Cr: 18, Ni: 8.0, Mo: 2.0; unit: ppb by mass). Except for the above, substantially the same procedure as in Example 5 was repeated. In Comparative Example 6, no oxymethylene copolymer was formed, and the internal temperature was not changed.

Comparative Example 7

In Comparative Example 7, before being used, the SUS316 autoclave reactor was acid-washed with a 1% by mass aqueous solution of sulfuric acid, and then washed with pure water and acetone and dried in air at 100° C. for one hour. Trioxane and 1,3-dioxolane were used as polymerization raw materials wherein the total concentration of metal components in the trioxane and 1,3-dioxolane was 350 ppb by mass (Na: 234, Fe: 88, Cr: 18, Ni: 8.0, Mo: 2.0; unit: ppb by mass). Except for the above, substantially the same procedure as in Example 6 was repeated. In Comparative Example 7, no oxymethylene copolymer was formed, and the internal temperature was not changed.

Example 7

Using, as a polymerization apparatus, a SUS316 autoclave reactor having a heater and a stirrer and having an inner capacity of 500 ml, an oxymethylene copolymer was produced by polymerization in a batch-wise manner. Before being used, the SUS316 autoclave reactor was acid-washed with a 1% by mass aqueous solution of sulfuric acid, and then washed with pure water and acetone and subjected to high-temperature heat treatment in air at 350° C. for 7 hours. The reactor was heated to 80° C., and the interior of the reactor was dried and purged with dry nitrogen gas. Then, 200 g of trioxane (which contained, as a stabilizer, hexamethylenebis[3-(3,5-di-t-butyl-4-hydroxyphenyl) propionate] that is a sterically hindered phenol compound in an amount of 100 ppm by mass, and which contained impurities, such as water, formic acid, and formaldehyde, each in an amount of 20 ppm by mass or less) and 10 g of 1,3-dioxolane as a comonomer were charged into the reactor, and the reactor was pressurized to 2.5 MPaG using high-pressure nitrogen gas. While stirring at 150 rpm, the resultant mixture was heated until the internal temperature reached 150° C. A polymerization initiator (in the form of a 3% by mass diethylene glycol dimethyl ether solution) and a salt of a protonic acid (in the form of a 0.5% by mass diethylene glycol dimethyl ether solution) in the respective amounts shown in Table 1, based on the mass of the trioxane, were mixed together immediately before being used, and charged into the reactor under pressure using a pump, together with 1 ml of benzene, to initiate a polymerization. In this instance, the concentration of metal components contained in the total of the trioxane and 1,3-dioxolane used in the polymerization before adding the polymerization initiator and the salt of protonic acid was as shown in Table 1. Further, the concentrations of the respective metal components were as shown in Table 3. The internal pressure of the reactor was raised up to 3 to 4 MPaG by the polymerization. After the polymerization was conducted for 2 minutes, trioctylamine in the form of a diethylene glycol dimethyl ether solution (solution concentration: 5 mmol/ml) in an amount corresponding to 100 times the mole of the polymerization initiator used was charged into the reactor under pressure using a pump, together with 1 ml of benzene. The resultant mixture was mixed at the number of revolutions of 50 rpm for 50 minutes to terminate the polymerization. The pressure in the reactor was released so as to evaporate the unreacted monomers and decomposition products, to obtain an oxymethylene copolymer.

After the start of the polymerization, the internal temperature was reduced by about 4° C., but thereafter the internal temperature was maintained at 146 to 152° C. The obtained oxymethylene copolymer was subjected to the above-mentioned thermal stabilization treatment, and the B/A ratio was measured using HS-GC. The result of the measurement is shown in Table 1.

Example 8

In Example 8, after the polymerization was conducted for 2 minutes, trioctylamine in the form of a diethylene glycol dimethyl ether solution (solution concentration: 5 mmol/ml) in an amount corresponding to 100 times the mole of the polymerization initiator used was charged into the reactor under pressure using a pump, together with 1 ml of benzene. The resultant mixture was stirred at the number of revolutions of 150 rpm for 50 minutes to terminate the polymerization. The concentration of metal components contained in the total of the trioxane and 1,3-dioxolane used in the polymerization before adding the polymerization initiator and the salt of protonic acid was as shown in Table 1. Except for the above, substantially the same procedure as in Example 7 was repeated. After the start of the polymerization, the internal temperature was reduced by about 4° C., but thereafter the internal temperature was maintained at 146 to 152° C. The obtained oxymethylene copolymer was subjected to the above-mentioned thermal stabilization treatment, and the B/A ratio was measured using HS-GC. The result of the measurement is shown in Table 1.

Examples 9 and 12

In these examples, after the polymerization was conducted for 2 minutes, trioctylamine in the form of a dieth-ylene glycol dimethyl ether solution (solution concentration: 5 mmol/ml) in an amount corresponding to 100 times the mole of the polymerization initiator used was charged into the reactor under pressure using a pump, together with 1 ml of benzene. The resultant mixture was mixed at the number of revolutions of 50 rpm for 5 minutes to terminate the polymerization. The concentration of metal components contained in the total of the trioxane and 1,3-dioxolane used in the polymerization before adding the polymerization initiator and the salt of protonic acid was as shown in Table 1. Except for the above, substantially the same procedure as in Example 7 was repeated. After the start of the polymerization, the internal temperature was reduced by about 4° C., but thereafter the internal temperature was maintained at 146 to 152° C. The obtained oxymethylene copolymer was subjected to the above-mentioned thermal stabilization treatment, and the B/A ratio was measured using HS-GC. The result of the measurement is shown in Table 1.

Example 10

In Example 10, after the polymerization was conducted for 2 minutes, trioctylamine in the form of a diethylene glycol dimethyl ether solution (solution concentration: 5 mmol/ml) in an amount corresponding to 100 times the mole of the polymerization initiator used was charged into the reactor under pressure using a pump, together with 1 ml of benzene. The resultant mixture was mixed at the number of revolutions of 150 rpm for 5 minutes to terminate the polymerization. The concentration of metal components contained in the total of the trioxane and 1,3-dioxolane used in the polymerization before adding the polymerization initiator and the salt of protonic acid was as shown in Table 1. Except for the above, substantially the same procedure as in Example 7 was repeated. After the start of the polymerization, the internal temperature was reduced by about 4° C., but thereafter the internal temperature was maintained at 146 to 152° C. The obtained oxymethylene copolymer was subjected to the above-mentioned thermal stabilization treatment, and the B/A ratio was measured using HS-GC. The result of the measurement is shown in Table 1.

Example 11

In Example 11, the temperature at the start of the polymerization was changed to 165° C. A polymerization initiator (in the form of a 3% by mass diethylene glycol dimethyl ether solution) and a salt of a protonic acid (in the form of a 0.5% by mass diethylene glycol dimethyl ether solution) in the respective amounts shown in Table 1, based on the mass of the trioxane, as well as acetone were mixed together immediately before being used. The concentration of metal components contained in the total of the trioxane and 1,3-dioxolane used in the polymerization before adding the polymerization initiator and the salt of protonic acid was as shown in Table 1. Except for the above, substantially the same procedure as in Example 9 was repeated. After the start of the polymerization, the internal temperature was reduced by about 4° C., but thereafter the internal temperature was maintained at 161 to 167° C. The obtained oxymethylene copolymer was subjected to the above-mentioned thermal stabilization treatment, and the B/A ratio was measured using HS-GC. The result of the measurement is shown in Table 1.

Comparative Example 8

Using, as a polymerization apparatus, a SUS304 bench two-shaft kneader having a jacket, sight glass, and two Z-type blades and having an inner capacity of 1 L, an oxymethylene copolymer was produced by polymerization in a batch-wise manner. The polymerization apparatus was not washed with an acid before being used. Hot water at 70° C. was circulated through the jacket. Further the interior of the apparatus was dried by heating using air at 100° C. for one hour. Then a cover was put on the apparatus and the inside system was purged with nitrogen gas. 300 g of trioxane (which contained, as a stabilizer, hexamethylenebis [3-(3,5-di-t-butyl-4-hydroxyphenyl) propionate] that is a sterically hindered phenol compound in an amount of 100 ppm by mass, and which contained impurities, such as water, formic acid, and formaldehyde, each in an amount of 20 ppm by mass or less) and 12 g of 1,3-dioxolane as a comonomer were charged into the apparatus through a raw material inlet. The resultant mixture was stirred using the Z-type blades. After the internal temperature reached 70° C., a boron trifluoride diethyl ether complex in the form of a benzene solution (solution concentration: 0.6 mmol/ml) in an amount of 77 ppm, based on the mass of the trioxane, was added to initiate a polymerization. In this instance, the total concentration of metal components contained in the total of the trioxane and 1,3-dioxolane used in the polymerization was 500 ppb by mass (Na: 91, Fe: 305, Cr: 72, Ni: 32; unit: ppb by mass). After the polymerization was conducted for 4 minutes, triethylamine in the form of a benzene solution (solution concentration: 5 mmol/ml) in an amount corresponding to 10 times the mole of the polymerization initiator used was added using a syringe to the polymerization apparatus. The resultant mixture was stirred for 15 minutes to terminate the polymerization to obtain an oxymethylene copolymer. After the start of the polymerization, deposition of the copolymer was visually observed through the sight glass and further the internal temperature was increased to 100° C. The obtained oxymethylene copolymer was subjected to the above-mentioned thermal stabilization treatment, and the B/A ratio was measured using HS-GC. The B/A ratio was found to be 2.02.

Comparative Example 9

In Comparative Example 9, before being used, the SUS316 autoclave reactor was acid-washed with a 1% by mass aqueous solution of sulfuric acid, and then washed with pure water and acetone and dried in air at 100° C. for one hour. Trioxane and 1,3-dioxolane were used as polymerization raw materials wherein the total concentration of metal components in the trioxane and 1,3-dioxolane was 350 ppb by mass (Na: 234, Fe: 88, Cr: 18, Ni: 8.0, Mo: 2.0; unit: ppb by mass). Except for the above, substantially the same procedure as in Example 7 was repeated. In Comparative Example 9, no oxymethylene copolymer was formed, and the internal temperature was not changed.

Comparative Example 10

In Comparative Example 10, before being used, the SUS316 autoclave reactor was acid-washed with a 1% by mass aqueous solution of sulfuric acid, and then washed with pure water and acetone and dried in air at 100° C. for one hour. Trioxane and 1,3-dioxolane were used as polymerization raw materials wherein the total concentration of metal components in the trioxane and 1,3-dioxolane was 350 ppb by mass (Na: 234, Fe: 88, Cr: 18, Ni: 8.0, Mo: 2.0; unit: ppb by mass). Except for the above, substantially the same procedure as in Example 8 was repeated. In Comparative Example 10, no oxymethylene copolymer was formed, and the internal temperature was not changed.

Comparative Example 11

In Comparative Example 11, before being used, the SUS316 autoclave reactor was acid-washed with a 1% by mass aqueous solution of sulfuric acid, and then washed with pure water and acetone and dried in air at 100° C. for one hour. Trioxane and 1,3-dioxolane were used as polymerization raw materials wherein the total concentration of metal components in the trioxane and 1,3-dioxolane was 350 ppb by mass (Na: 234, Fe: 88, Cr: 18, Ni: 8.0, Mo: 2.0; unit: ppb by mass). Except for the above, substantially the same procedure as in Example 9 was repeated. In Comparative Example 11, no oxymethylene copolymer was formed, and the internal temperature was not changed.

Comparative Example 12

In Comparative Example 12, before being used, the SUS316 autoclave reactor was acid-washed with a 1% by mass aqueous solution of sulfuric acid, and then washed with pure water and acetone and dried in air at 100° C. for one hour. Trioxane and 1,3-dioxolane were used as polymerization raw materials wherein the total concentration of metal components in the trioxane and 1,3-dioxolane was 350 ppb by mass (Na: 234, Fe: 88, Cr: 18, Ni: 8.0, Mo: 2.0; unit: ppb by mass). Except for the above, substantially the same procedure as in Example 10 was repeated. In Comparative Example 12, no oxymethylene copolymer was formed, and the internal temperature was not changed.

Comparative Example 13

In Comparative Example 13, before being used, the SUS316 autoclave reactor was acid-washed with a 1% by mass aqueous solution of sulfuric acid, and then washed with pure water and acetone and dried in air at 100° C. for one hour. Trioxane and 1,3-dioxolane were used as polymerization raw materials wherein the total concentration of metal components in the trioxane and 1,3-dioxolane was 350 ppb by mass (Na: 234, Fe: 88, Cr: 18, Ni: 8.0, Mo: 2.0; unit: ppb by mass). Except for the above, substantially the same procedure as in Example 11 was repeated. In Comparative Example 13, no oxymethylene copolymer was formed, and the internal temperature was not changed.

Comparative Example 14

In Comparative Example 14, before being used, the SUS316 autoclave reactor was acid-washed with a 1% by mass aqueous solution of sulfuric acid, and then washed with pure water and acetone and dried in air at 100° C. for one hour. Trioxane and 1,3-dioxolane were used as polymerization raw materials wherein the total concentration of metal components in the trioxane and 1,3-dioxolane was 350 ppb by mass (Na: 234, Fe: 88, Cr: 18, Ni: 8.0, Mo: 2.0; unit: ppb by mass). Except for the above, substantially the same procedure as in Example 12 was repeated. In Comparative Example 14, no oxymethylene copolymer was formed, and the internal temperature was not changed.

Example 13

Using, as a polymerization apparatus, a SUS316 autoclave reactor having a heater and a stirrer and having an inner capacity of 500 ml, an oxymethylene copolymer was produced by polymerization in a batch-wise manner. Before being used, the SUS316 autoclave reactor was acid-washed with a 1% by mass aqueous solution of sulfuric acid, and then washed with pure water and acetone and subjected to high-temperature heat treatment in air at 350° C. for 7 hours. The reactor was heated to 80° C., and the interior of the reactor was dried and purged with dry nitrogen gas. Then, 200 g of trioxane (which contained, as a stabilizer, hexamethylenebis[3-(3,5-di-t-butyl-4-hydroxyphenyl) propionate] that is a sterically hindered phenol compound in an amount of 100 ppm by mass, and which contained impurities, such as water, formic acid, and formaldehyde, each in an amount of 20 ppm by mass or less) and 10 g of 1,3-dioxolane as a comonomer were charged into the reactor. The reactor was pressurized to 2.5 MPaG using high-pressure nitrogen gas. While stirring at 150 rpm, the resultant mixture was heated until the internal temperature reached 150° C. A polymerization initiator (in the form of a 3% by mass diethylene glycol dimethyl ether solution) and a salt of a protonic acid (in the form of a 0.5% by mass diethylene glycol dimethyl ether solution) in the respective amounts shown in Table 1, based on the mass of the trioxane, were mixed together immediately before being used, and charged into the reactor under pressure using a pump, together with 1 ml of benzene, to initiate a polymerization. In this instance, the concentration of metal components contained in the total of the trioxane and 1,3-dioxolane used in the polymerization before adding the polymerization initiator and the salt of protonic acid was as shown in Table 1. Further, the concentrations of the respective metal components were as shown in Table 3. The internal pressure of the reactor was raised up to 3 to 4 MPaG by the polymerization. After the polymerization was conducted for 2 minutes, tributylamine in the form of a diethylene glycol dimethyl ether solution (solution concentration: 5 mmol/ml) in an amount corresponding to 10 times the mole of the polymerization initiator used was charged into the reactor under pressure using a pump, together with 1 ml of benzene. The resultant mixture was mixed for 5 minutes to terminate the polymerization. The pressure in the reactor was released so as to evaporate the unreacted monomers and decomposition products, to obtain an oxymethylene copolymer.

After the start of the polymerization, the internal temperature was reduced by about 4° C., but thereafter the internal temperature was maintained at 146 to 152° C. The obtained oxymethylene copolymer was subjected to the above-mentioned thermal stabilization treatment, and the content of the oxymethylene copolymer having a polymethyl methacrylate-converted, number average molecular weight of less than 10,000 in the resultant oxymethylene copolymer was measured by GPC. The result of the measurement is shown in Table 1.

Example 14

In Example 14, after the polymerization was conducted for 2 minutes, sodium methoxide in the form of a diethylene glycol dimethyl ether solution (solution concentration: 5 mmol/ml) in an amount corresponding to 1.2 times the mole of the polymerization initiator used was charged into the reactor under pressure using a pump, together with 1 ml of benzene. The resultant mixture was mixed for 5 minutes to terminate the polymerization. The concentration of metal components contained in the total of the trioxane and 1,3-dioxolane used in the polymerization before adding the polymerization initiator and the salt of protonic acid was as shown in Table 1, to obtain an oxymethylene copolymer. Except for the above, substantially the same procedure as in Example 13 was repeated. After the start of the polymerization, the internal temperature was reduced by about 4° C., but thereafter the internal temperature was maintained at 146 to 152° C. The obtained oxymethylene copolymer was subjected to the above-mentioned thermal stabilization treatment, and the content of the oxymethylene copolymer having a polymethyl methacrylate-converted, number average molecular weight of less than 10,000 in the resultant oxymethylene copolymer was measured by GPC. The result of the measurement is shown in Table 1.

Example 15

In Example 15, after the polymerization was conducted for 2 minutes, sodium methoxide in the form of a diethylene glycol dimethyl ether solution (solution concentration: 5 mmol/ml) in an amount corresponding to 1.1 times the mole of the polymerization initiator used was charged into the reactor under pressure using a pump, together with 1 ml of benzene. The resultant mixture was mixed for 5 minutes to terminate the polymerization. The concentration of metal components contained in the total of the trioxane and 1,3-dioxolane used in the polymerization before adding the polymerization initiator and the salt of protonic acid was as shown in Table 1, to obtain an oxymethylene copolymer. Except for the above, substantially the same procedure as in Example 13 was repeated. After the start of the polymerization, the internal temperature was reduced by about 4° C., but thereafter the internal temperature was maintained at 146 to 152° C. The obtained oxymethylene copolymer was subjected to the above-mentioned thermal stabilization treatment, and the content of the oxymethylene copolymer having a polymethyl methacrylate-converted, number average molecular weight of less than 10,000 in the resultant oxymethylene copolymer was measured by GPC. The result of the measurement is shown in Table 1.

Example 16

In Example 16, after the polymerization was conducted for 2 minutes, sodium methoxide in the form of a diethylene glycol dimethyl ether solution (solution concentration: 5 mmol/ml) in an amount corresponding to 1.0 time the mole of the polymerization initiator used was charged into the reactor under pressure using a pump, together with 1 ml of benzene. The resultant mixture was stirred for 5 minutes to terminate the polymerization. The concentration of metal components contained in the total of the trioxane and 1,3-dioxolane used in the polymerization before adding the polymerization initiator and the salt of protonic acid was as shown in Table 1, to obtain an oxymethylene copolymer. Except for the above, substantially the same procedure as in Example 13 was repeated. After the start of the polymerization, the internal temperature was reduced by about 4° C., but thereafter the internal temperature was maintained at 146 to 152° C. The obtained oxymethylene copolymer was subjected to the above-mentioned thermal stabilization treatment, and the content of the oxymethylene copolymer having a polymethyl methacrylate-converted, number average molecular weight of less than 10,000 in the resultant oxymethylene copolymer was measured by GPC. The result of the measurement is shown in Table 1.

Example 17

In Example 17, after the polymerization was conducted for 2 minutes, hexamethoxymethylmelamine in the form of a diethylene glycol dimethyl ether solution (solution concentration: 5 mmol/ml) in an amount corresponding to 20 times the mole of the polymerization initiator used was charged into the reactor under pressure using a pump, together with 1 ml of benzene. The resultant mixture was stirred for 5 minutes to terminate the polymerization. The concentration of metal components contained in the total of the trioxane and 1,3-dioxolane used in the polymerization before adding the polymerization initiator and the salt of protonic acid was as shown in Table 1, to obtain an oxymethylene copolymer. Except for the above, substantially the same procedure as in Example 13 was repeated. After the start of the polymerization, the internal temperature was reduced by about 4° C., but thereafter the internal temperature was maintained at 146 to 152° C. The obtained oxymethylene copolymer was subjected to the above-mentioned thermal stabilization treatment, and the content of the oxymethylene copolymer having a polymethyl methacrylate-converted, number average molecular weight of less than 10,000 in the resultant oxymethylene copolymer was measured by GPC. The result of the measurement is shown in Table 1.

Example 18

In Example 18, the temperature at the start of the polymerization was changed to 165° C. The polymerization initiator (in the form of a 3% by mass diethylene glycol dimethyl ether solution) and a salt of a protonic acid (in the form of a 0.5% by mass diethylene glycol dimethyl ether solution) in the respective amounts shown in Table 1, based on the mass of the trioxane, as well as acetone were mixed together immediately before being used. After the polymerization was conducted for 2 minutes, trioctylamine in the form of a diethylene glycol dimethyl ether solution (solution concentration: 5 mmol/ml) in an amount corresponding to 100 times the mole of the polymerization initiator used was charged into the reactor under pressure using a pump, together with 1 ml of benzene. The resultant mixture was stirred for 5 minutes to terminate the polymerization. The concentration of metal components contained in the total of the trioxane and 1,3-dioxolane used in the polymerization before adding the polymerization initiator and the salt of protonic acid was as shown in Table 1, to obtain an oxymethylene copolymer. Except for the above, substantially the same procedure as in Example 13 was repeated. After the start of the polymerization, the internal temperature was reduced by about 4° C., but thereafter the internal temperature was maintained at 161 to 167° C. The obtained oxymethylene copolymer was subjected to the above-mentioned thermal stabilization treatment, and the content of the oxymethylene copolymer having a polymethyl methacrylate-converted, number average molecular weight of less than 10,000 in the resultant oxymethylene copolymer was measured by GPC. The result of the measurement is shown in Table 1.

Example 19

In Example 19, after the polymerization was conducted for 2 minutes, trioctylamine in the form of a diethylene glycol dimethyl ether solution (solution concentration: 5 mmol/ml) in an amount corresponding to 100 times the mole of the polymerization initiator used was charged into the reactor under pressure using a pump, together with 1 ml of benzene. The resultant mixture was mixed for 5 minutes to terminate the polymerization. The concentration of metal components contained in the total of the trioxane and 1,3-dioxolane used in the polymerization before adding the polymerization initiator and the salt of protonic acid was as shown in Table 1, to obtain an oxymethylene copolymer. Except for the above, substantially the same procedure as in Example 13 was repeated. After the start of the polymerization, the internal temperature was reduced by about 4° C., but thereafter the internal temperature was maintained at 146 to 152° C. The obtained oxymethylene copolymer was subjected to the above-mentioned thermal stabilization treatment, and the content of the oxymethylene copolymer having a polymethyl methacrylate-converted, number average molecular weight of less than 10,000 in the resultant oxymethylene copolymer was measured by GPC. The result of the measurement is shown in Table 1.

Comparative Example 15

Using, as a polymerization apparatus, a SUS304 bench two-shaft kneader having a jacket, sight glass, and two Z-type blades and having an inner capacity of 1 L, an oxymethylene copolymer was produced by polymerization in a batch-wise manner. The polymerization apparatus was not washed with an acid before being used. Hot water at 70° C. was circulated through the jacket. Further the interior of the apparatus was dried by heating using air at 100° C. for one hour. Then a cover was put on the apparatus and the inside system was purged with nitrogen gas. 300 g of trioxane (which contained, as a stabilizer, hexamethylenebis [3-(3,5-di-t-butyl-4-hydroxyphenyl) propionate] that is a sterically hindered phenol compound in an amount of 100 ppm by mass, and which contained impurities, such as water, formic acid, and formaldehyde, each in an amount of 20 ppm by mass or less) and 12 g of 1,3-dioxolane as a comonomer were charged into the apparatus through a raw material inlet. The resultant mixture was stirred using the Z-type blades. After the internal temperature reached 70° C., a boron trifluoride diethyl ether complex (in the form of a 0.008% by mass diethyl glycol dimethyl ether solution) in an amount of 77 ppm, based on the mass of the trioxane, was added to initiate a polymerization. In this instance, the total concentration of metal components contained in the trioxane and 1,3-dioxolane used in the polymerization before adding the boron trifluoride diethyl ether complex was 500 ppb by mass (Na: 91, Fe: 305, Cr: 72, Ni: 32; unit: ppb by mass). After the polymerization was conducted for 4 minutes, triphenylphosphine in the form of a benzene solution (solution concentration: 5 mmol/ml) in an amount corresponding to 10 times the mole of the polymerization initiator used was added using a syringe to the polymerization apparatus. The resultant mixture was stirred for 15 minutes to terminate the polymerization, to obtain an oxymethylene copolymer.

After the start of the polymerization, the internal temperature was increased to 103° C. The obtained oxymethylene copolymer was pulverized and low boiling-point materials were removed therefrom under a reduced pressure. Then, the oxymethylene copolymer was subjected to thermal stabilization treatment, and the content of the oxymethylene copolymer having a polymethyl methacrylate-converted, number average molecular weight of less than 10,000 in the resultant oxymethylene copolymer was measured by GPC. As a result, the content was found to be 5.9%.

Comparative Example 16

In Comparative Example 16, before being used, the SUS316 autoclave reactor was acid-washed with a 1% by mass aqueous solution of sulfuric acid, and then washed with pure water and acetone and dried in air at 100° C. for one hour. Trioxane and 1,3-dioxolane were used as polymerization raw materials wherein the total concentration of metal components in the trioxane and 1,3-dioxolane was 350 ppb by mass (Na: 234, Fe: 88, Cr: 18, Ni: 8.0, Mo: 2.0; unit: ppb by mass). Except for the above, substantially the same procedure as in Example 13 was repeated. In Comparative Example 16, no oxymethylene copolymer was formed, and the internal temperature was not changed.

Comparative Example 17

In Comparative Example 17, before being used, the SUS316 autoclave reactor was acid-washed with a 1% by mass aqueous solution of sulfuric acid, and then washed with pure water and acetone and dried in air at 100° C. for one hour. Trioxane and 1,3-dioxolane were used as polymerization raw materials wherein the total concentration of metal components in the trioxane and 1,3-dioxolane was 350 ppb by mass (Na: 234, Fe: 88, Cr: 18, Ni: 8.0, Mo: 2.0; unit: ppb by mass). Except for the above, substantially the same procedure as in Example 14 was repeated. In Comparative Example 17, no oxymethylene copolymer was formed, and the internal temperature was not changed.

Comparative Example 18

In Comparative Example 18, before being used, the SUS316 autoclave reactor was acid-washed with a 1% by mass aqueous solution of sulfuric acid, and then washed with pure water and acetone and dried in air at 100° C. for one hour. Trioxane and 1,3-dioxolane were used as polymerization raw materials wherein the total concentration of metal components in the trioxane and 1,3-dioxolane was 350 ppb by mass (Na: 234, Fe: 88, Cr: 18, Ni: 8.0, Mo: 2.0; unit: ppb by mass). Except for the above, substantially the same procedure as in Example 15 was repeated. In Comparative Example 18, no oxymethylene copolymer was formed, and the internal temperature was not changed.

Comparative Example 19

In Comparative Example 19, before being used, the SUS316 autoclave reactor was acid-washed with a 1% by mass aqueous solution of sulfuric acid, and then washed with pure water and acetone and dried in air at 100° C. for one hour. Trioxane and 1,3-dioxolane were used as polymerization raw materials wherein the total concentration of metal components in the trioxane and 1,3-dioxolane was 350 ppb by mass (Na: 234, Fe: 88, Cr: 18, Ni: 8.0, Mo: 2.0; unit: ppb by mass). Except for the above, substantially the same procedure as in Example 16 was repeated. In Comparative Example 19, no oxymethylene copolymer was formed, and the internal temperature was not changed.

Comparative Example 20

In Comparative Example 20, before being used, the SUS316 autoclave reactor was acid-washed with a 1% by mass aqueous solution of sulfuric acid, and then washed with pure water and acetone and dried in air at 100° C. for one hour. Trioxane and 1,3-dioxolane were used as polymerization raw materials wherein the total concentration of metal components in the trioxane and 1,3-dioxolane was 350 ppb by mass (Na: 234, Fe: 88, Cr: 18, Ni: 8.0, Mo: 2.0; unit: ppb by mass). Except for the above, substantially the same procedure as in Example 17 was repeated. In Comparative Example 20, no oxymethylene copolymer was formed, and the internal temperature was not changed.

Comparative Example 21

In Comparative Example 21, before being used, the SUS316 autoclave reactor was acid-washed with a 1% by mass aqueous solution of sulfuric acid, and then washed with pure water and acetone and dried in air at 100° C. for one hour. Trioxane and 1,3-dioxolane were used as polymerization raw materials wherein the total concentration of metal components in the trioxane and 1,3-dioxolane was 350 ppb by mass (Na: 234, Fe: 88, Cr: 18, Ni: 8.0, Mo: 2.0; unit: ppb by mass). Except for the above, substantially the same procedure as in Example 18 was repeated. In Comparative Example 21, no oxymethylene copolymer was formed, and the internal temperature was not changed.

Comparative Example 22

In Comparative Example 22, before being used, the SUS316 autoclave reactor was acid-washed with a 1% by mass aqueous solution of sulfuric acid, and then washed with pure water and acetone and dried in air at 100° C. for one hour. Trioxane and 1,3-dioxolane were used as polymerization raw materials wherein the total concentration of metal components in the trioxane and 1,3-dioxolane was 350 ppb by mass (Na: 234, Fe: 88, Cr: 18, Ni: 8.0, Mo: 2.0; unit: ppb by mass). Except for the above, substantially the same procedure as in Example 19 was repeated. In Comparative Example 22, no oxymethylene copolymer was formed, and the internal temperature was not changed.

TABLE 1

| | Temperature at start of polymerization °C. | Rate of stirring rpm | Polymerization time min | Concentration of metals in TOX + DOL ppb | Initiator Type | Initiator Concentration ppm | Salt of protonic acid Type | Salt of protonic acid Concentration ppm | Acetone Concentration ppm | Terminator Type | Terminator Amount eq |
|---|---|---|---|---|---|---|---|---|---|---|---|
| Example 1 | 155 | 150 | 2 | 140 | HClO$_4$ | 1.2 | NaClO$_4$ | 1.2 | — | Bu$_3$N | 2 |
| Example 2 | 155 | 150 | 2 | 150 | HClO$_4$ | 1.2 | NaClO$_4$ | 1.2 | — | CH$_3$ONa | 1.2 |
| Example 3 | 150 | 150 | 2 | 220 | HClO$_4$ | 1.2 | NaClO$_4$ | 1.2 | — | Oct$_3$N | 100 |
| Example 4 | 155 | 150 | 2 | 160 | HClO$_4$ | 1.2 | NaClO$_4$ | 1.2 | — | cymel303 | 1.5 |
| Example 5 | 165 | 150 | 2 | 170 | HClO$_4$ | 1.2 | NaClO$_4$ | 1.2 | 800 | Oct$_3$N | 100 |
| Example 6 | 150 | 150 | 2 | 190 | CF$_3$SO$_3$H | 1.8 | TEAT | 3.0 | — | Oct$_3$N | 100 |
| Example 7 | — | — | — | 160 | HClO$_4$ | 1.2 | NaClO$_4$ | 1.2 | — | Oct$_3$N | 100 |

TABLE 1-continued

| | | | | | | | | | | | |
|---|---|---|---|---|---|---|---|---|---|---|---|
| Example 8 | — | — | — | 150 | HClO$_4$ | 1.2 | NaClO$_4$ | 1.2 | — | Oct$_3$N | 100 |
| Example 9 | — | — | — | 140 | HClO$_4$ | 1.2 | NaClO$_4$ | 1.2 | — | Oct$_3$N | 100 |
| Example 10 | — | — | — | 160 | HClO$_4$ | 1.2 | NaClO$_4$ | 1.2 | — | Oct$_3$N | 100 |
| Example 11 | — | — | — | 170 | HClO$_4$ | 1.2 | NaClO$_4$ | 1.2 | 800 | Oct$_3$N | 100 |
| Example 12 | — | — | — | 190 | CF$_3$SO$_3$H | 1.8 | TEAT | 3.0 | — | Oct$_3$N | 100 |
| Example 13 | — | — | — | 190 | HClO$_4$ | 1.2 | NaClO$_4$ | 1.2 | — | Bu$_3$N | 10 |
| Example 14 | — | — | — | 150 | HClO$_4$ | 1.2 | NaClO$_4$ | 1.2 | — | CH$_3$ONa | 1.2 |
| Example 15 | — | — | — | 140 | HClO$_4$ | 1.2 | NaClO$_4$ | 1.2 | — | CH$_3$ONa | 1.1 |
| Example 16 | — | — | — | 160 | HClO$_4$ | 1.2 | NaClO$_4$ | 1.2 | — | CH$_3$ONa | 1 |
| Example 17 | — | — | — | 150 | HClO$_4$ | 1.2 | NaClO$_4$ | 1.2 | — | cymel303 | 20 |
| Example 18 | — | — | — | 170 | HClO$_4$ | 1.2 | NaClO$_4$ | 1.2 | 800 | Oct$_3$N | 100 |
| Example 19 | — | — | — | 190 | CF$_3$SO$_3$H | 1.8 | TEAT | 3.0 | — | Oct$_3$N | 100 |

| | Rate of stirring for termination reaction rpm | Termination reaction time min | Formate end group content μmol/g | Formaldehyde concentration (A) ppm | Formaldehyde concentration (B) ppm | Increase of formaldehyde generation due to high-humidity treatment (B/A ratio) | Weight average molecular weight Mw | Content of oxymethylene copolymer having a polymethyl methacrylate-converted, number average molecular weight of less than 10,000 (%) | Yield (%) |
|---|---|---|---|---|---|---|---|---|---|
| Example 1 | — | — | 3.4 | — | — | — | — | — | 61 |
| Example 2 | — | — | 3.5 | — | — | — | — | — | 61 |
| Example 3 | — | — | 4.7 | — | — | — | — | — | 64 |
| Example 4 | — | — | 3.7 | — | — | — | — | — | 60 |
| Example 5 | — | — | 4.0 | — | — | — | — | — | 65 |
| Example 6 | — | — | 4.5 | — | — | — | — | — | 71 |
| Example 7 | 50 | 50 | — | 292 | 434 | 1.49 | — | — | 64 |
| Example 8 | 150 | 50 | — | 350 | 509 | 1.45 | — | — | 67 |
| Example 9 | 50 | 5 | — | 364 | 473 | 1.30 | — | — | 63 |
| Example 10 | 150 | 5 | — | 401 | 574 | 1.43 | — | — | 64 |
| Example 11 | 50 | 50 | — | 265 | 461 | 1.74 | — | — | 65 |
| Example 12 | 50 | 50 | — | 162 | 293 | 1.77 | — | — | 71 |
| Example 13 | — | — | — | — | — | — | 222700 | 3.6 | 60 |
| Example 14 | — | — | — | — | — | — | 212200 | 3.1 | 61 |
| Example 15 | — | — | — | — | — | — | 211500 | 3.1 | 69 |
| Example 16 | — | — | — | — | — | — | 204100 | 3.4 | 65 |
| Example 17 | — | — | — | — | — | — | 199300 | 3.2 | 64 |
| Example 18 | — | — | — | — | — | — | 199300 | 3.5 | 65 |
| Example 19 | — | — | — | — | — | — | 199300 | 3.7 | 71 |

Concentration of metals in TOX + DOL: Total concentration of metal components contained in trioxane and 1,3-dioxolane
Bu$_3$N: Tri-n-butylamine (n-C$_4$H$_9$)$_3$N
0ct3N: Tri-n-octylamine (n-C$_8$H$_{17}$)$_3$N
cymel303: N,N,N,N',N'',N''-Hexakis(methoxymethyl)-1,3,5-triazine-2,4,6-triamine
TEAT: Triethylammoniumu triflate CF$_3$SO$_3$•NHEt$_3$
The concentration of each of the initiator and the salt of protonic acid is a value based on the mass of the tr oxane used.
The amount of the terminator added is a mole relative to the initiator.

TABLE 2

| | Temperature at start of polymerization °C. | Rate of stirring rpm | Polymerization time min | Concentration of metals in TOX + DOL ppb | Initiator Type | Initiator Concentration ppm | Salt of protinic acid Type | Salt of protinic acid Concentration ppm |
|---|---|---|---|---|---|---|---|---|
| Comparative Example 2 | 150 | 150 | 2 | 350 | HClO$_4$ | 1.2 | NaClO$_4$ | 1.2 |
| Comparative Example 3 | 155 | 150 | 2 | 350 | HClO$_4$ | 1.2 | NaClO$_4$ | 1.2 |
| Comparative Example 4 | 150 | 150 | 2 | 350 | HClO$_4$ | 1.2 | NaClO$_4$ | 1.2 |
| Comparative Example 5 | 155 | 150 | 2 | 350 | HClO$_4$ | 1.2 | NaClO$_4$ | 1.2 |
| Comparative Example 6 | 165 | 150 | 2 | 350 | HClO$_4$ | 1.2 | NaClO$_4$ | 1.2 |
| Comparative Example 7 | 150 | 150 | 2 | 350 | CF$_3$SO$_3$H | 1.8 | TEAT | 3 |
| Comparative Example 9 | — | — | — | 350 | HClO$_4$ | 1.2 | NaClO$_4$ | 1.2 |
| Comparative Example 10 | — | — | — | 350 | HClO$_4$ | 1.2 | NaClO$_4$ | 1.2 |
| Comparative Example 11 | — | — | — | 350 | HClO$_4$ | 1.2 | NaClO$_4$ | 1.2 |
| Comparative Example 12 | — | — | — | 350 | HClO$_4$ | 1.2 | NaClO$_4$ | 1.2 |

TABLE 2-continued

| | | | | | | | | |
|---|---|---|---|---|---|---|---|---|
| Comparative Example 13 | — | — | — | 350 | $HClO_4$ | 1.2 | $NaClO_4$ | 1.2 |
| Comparative Example 14 | — | — | — | 350 | $CF_3SO_3H$ | 1.8 | TEAT | 3 |
| Comparative Example 16 | — | — | — | 350 | $HClO_4$ | 1.2 | $NaClO_4$ | 1.2 |
| Comparative Example 17 | — | — | — | 350 | $HClO_4$ | 1.2 | $NaClO_4$ | 1.2 |
| Comparative Example 18 | — | — | — | 350 | $HClO_4$ | 1.2 | $NaClO_4$ | 1.2 |
| Comparative Example 19 | — | — | — | 350 | $HClO_4$ | 1.2 | $NaClO_4$ | 1.2 |
| Comparative Example 20 | — | — | — | 350 | $HClO_4$ | 1.2 | $NaClO_4$ | 1.2 |
| Comparative Example 21 | — | — | — | 350 | $HClO_4$ | 1.2 | $NaClO_4$ | 1.2 |
| Comparative Example 22 | — | — | — | 350 | $CF_3SO_3H$ | 1.8 | TEAT | 3 |

| | Acetone Concentration ppm | Terminator Type | Terminator Amount eq | Rate of stirring for termination reaction rpm | Termination reaction time min | Yield (%) |
|---|---|---|---|---|---|---|
| Comparative Example 2 | — | $Bu_3N$ | 2 | — | — | Not polymerized |
| Comparative Example 3 | — | $CH_3ONa$ | 1.2 | — | — | Not polymerized |
| Comparative Example 4 | — | $Oct_3N$ | 100 | — | — | Not polymerized |
| Comparative Example 5 | — | cymel303 | 1.5 | — | — | Not polymerized |
| Comparative Example 6 | 800 | $Oct_3N$ | 100 | — | — | Not polymerized |
| Comparative Example 7 | — | $Oct_3N$ | 100 | — | — | Not polymerized |
| Comparative Example 9 | — | $Oct_3N$ | 100 | 50 | 50 | Not polymerized |
| Comparative Example 10 | — | $Oct_3N$ | 100 | 150 | 50 | Not polymerized |
| Comparative Example 11 | — | $Oct_3N$ | 100 | 50 | 5 | Not polymerized |
| Comparative Example 12 | — | $Oct_3N$ | 100 | 150 | 5 | Not polymerized |
| Comparative Example 13 | 800 | $Oct_3N$ | 100 | 50 | 50 | Not polymerized |
| Comparative Example 14 | — | $Oct_3N$ | 100 | 50 | 50 | Not polymerized |
| Comparative Example 16 | — | $Bu_3N$ | 10 | — | — | Not polymerized |
| Comparative Example 17 | — | $CH_3ONa$ | 1.2 | — | — | Not polymerized |
| Comparative Example 18 | — | $CH_3ONa$ | 1.1 | — | — | Not polymerized |
| Comparative Example 19 | — | $CH_3ONa$ | 1 | — | — | Not polymerized |
| Comparative Example 20 | — | cymel303 | 20 | — | — | Not polymerized |
| Comparative Example 21 | 800 | $Oct_3N$ | 100 | — | — | Not polymerized |
| Comparative Example 22 | — | $Oct_3N$ | 100 | — | — | Not polymerized |

Concentration of metals in TOX + DOL: Total concentration of metal components contained in trioxane and 1,3-dioxolane
$Bu_3N$ : Tri-n-butylamine $(n-C_4H_9)_3N$
$Oct_3N$: Tri-n-octylamine $(n-C_8H_{17})_3N$
cymel303: N,N,N,N',N",N"-Hexakis(methoxymethyl)-1,3,5-triazine-2,4,6-triamine
TEAT: Triethylammoniumu triflate $CF_3SO_3 \cdot NHEt_3$
The concentration of each of the initiator and the salt of protonic acid is a value based on the mass of the trioxane used.
The amount of the terminator added is a mole relative to the initiator.

TABLE 3

| | Concentration of Na in TOX + DOL ppb | Concentration of Fe in TOX + DOL ppb | Concentration of Cr in TOX + DOL ppb | Concentration of Ni in TOX + DOL ppb | Concentration of Mo in TOX + DOL ppb |
|---|---|---|---|---|---|
| Example 1 | 121 | 15 | 2 | 1 | 1 |
| Example 2 | 130 | 16 | 2 | 1 | 1 |
| Example 3 | 146 | 62 | 7 | 4 | 1 |
| Example 4 | 129 | 25 | 3 | 2 | 1 |
| Example 5 | 125 | 37 | 4 | 3 | 1 |
| Example 6 | 124 | 55 | 6 | 4 | 1 |
| Example 7 | 122 | 32 | 3 | 2 | 1 |
| Example 8 | 115 | 29 | 3 | 2 | 1 |
| Example 9 | 121 | 15 | 2 | 1 | 1 |
| Example 10 | 129 | 25 | 3 | 2 | 1 |
| Example 11 | 125 | 37 | 4 | 3 | 1 |
| Example 12 | 124 | 55 | 6 | 4 | 1 |
| Example 13 | 114 | 64 | 7 | 4 | 1 |
| Example 14 | 130 | 16 | 2 | 1 | 1 |
| Example 15 | 121 | 15 | 2 | 1 | 1 |
| Example 16 | 124 | 30 | 3 | 2 | 1 |
| Example 17 | 125 | 21 | 2 | 1 | 1 |
| Example 18 | 125 | 37 | 4 | 3 | 1 |
| Example 19 | 124 | 55 | 6 | 4 | 1 |

Discussion on Examples and Comparative Examples

In Examples 1 to 6, the polymerization reaction was conducted at a temperature of 145 to 167° C. using such raw materials that the total concentration of metal components contained in the trioxane and 1,3-dioxolane was 300 ppb by mass or less, in the presence of both a protonic acid having a molecular weight of 1,000 or less and a salt of the protonic acid which coexisted with each other. The oxymethylene copolymers obtained in Examples 1 to 6 gave a formate end group content per gram of the oxymethylene copolymer of 5.0 µmol or less. In contrast, in Comparative Example 1, such raw materials that the total concentration of metal components contained in the trioxane and 1,3-dioxolane was 500 ppb by mass were subjected to bulk polymerization at a temperature of 70 to 102° C. using a polymerization initiator, and the formed polymer was allowed to suffer precipitation and solidification as the polymerization proceeded. The oxymethylene copolymer obtained in Comparative Example 1 gave a formate end group content per gram of the oxymethylene copolymer of 10.7 µmol.

In Comparative Examples 2 to 7, the polymerization was conducted using such raw materials that the total concentration of metal components contained in the trioxane and 1,3-dioxolane was more than 300 ppb by mass, in the presence of both a protonic acid having a molecular weight of 1,000 or less and a salt of the protonic acid which coexisted with each other. In Comparative Examples 2 to 7, however, no polymerization proceeded. That is, the results of the polymerization conducted in Comparative Examples 2 to 7 were markedly poor, as compared to the results of the polymerization conducted in Examples 1 to 6. The conditions of Examples 1 to 6 are substantially the same as in Comparative Examples 2 to 7 except that the total concentration of metal components contained in the trioxane and 1,3-dioxolane was 300 ppb by mass or less in Examples 1 to 6.

Further, in Examples 1 to 6 in which the temperature at the start of the polymerization was 150 to 165° C., the temperature was lowered by 3 to 5° C. after the start of the polymerization, and then increased to a temperature only 2° C. higher than the temperature at the start of the polymerization. In contrast, in Comparative Example 1 in which the temperature at the start of the polymerization was 70° C., deposition of the copolymer was visually observed through the sight glass after the start of the polymerization, and further the temperature was increased to a temperature not less than 30° C. higher than the temperature at the start of the polymerization due to the heat of crystallization of the copolymer. The above results show that no deposition of the copolymer occurred in Examples 1 to 6 in which the temperature at the start of the polymerization was 150 to 165° C.

In Examples 7 to 12, the polymerization reaction was conducted at a temperature of 146 to 167° C. using such raw materials that the total concentration of metal components contained in the trioxane and 1,3-dioxolane was 300 ppb by mass or less, in the presence of both a protonic acid having a molecular weight of 1,000 or less and a salt of the protonic acid which coexisted with each other. The oxymethylene copolymers obtained in Examples 7 to 12 gave a ratio (B/A ratio) of [formaldehyde generation amount (B) of the oxymethylene copolymer after heat treatment at a relative humidity of 98% at 80° C. for 24 hours and at a relative humidity of 11% at 80° C. for 3 hours]/[formaldehyde generation amount (A) of the oxymethylene copolymer after heat treatment at a relative humidity of 11% at 80° C. for 3 hours] of 1.80 or less. In contrast, in Comparative Example 8, such raw materials that the total concentration of metal components contained in the trioxane and 1,3-dioxolane was 500 ppb by mass were subjected to bulk polymerization at a temperature of 70 to 100° C. using a polymerization initiator and the formed polymer was allowed to suffer precipitation and solidification as the polymerization proceeded. The oxymethylene copolymer obtained in Comparative Example 8 gave such a poor B/A ratio as 2.02.

In Comparative Examples 9 to 14, the polymerization was conducted using such raw materials that the total concentration of metal components contained in the trioxane and 1,3-dioxolane was more than 300 ppb by mass, in the presence of both a protonic acid having a molecular weight of 1,000 or less and a salt of the protonic acid which coexisted with each other. In Comparative Examples 9 to 14, however, no polymerization proceeded. That is, the results of the polymerization conducted in Comparative Examples 9 to 14 were markedly poor, as compared to the results of the polymerization conducted in Examples 7 to 12. The conditions of Examples 7 to 12 were substantially the same as in Comparative Examples 9 to 14 except that the total concentration of metal components contained in the trioxane and 1,3-dioxolane was 300 ppb by mass or less in Examples 7 to 12.

Further, in Examples 7 to 12 in which the temperature at the start of the polymerization was 150 to 165° C., the temperature was lowered by 4° C. after the start of the polymerization, and then increased to a temperature only 2° C. higher than the temperature at the start of the polymerization. In contrast, in Comparative Example 8 in which the temperature at the start of the polymerization was 70° C., deposition of the copolymer was visually observed through the sight glass after the start of the polymerization, and further the temperature was increased to a temperature 30° C. higher than the temperature at the start of the polymerization due to the heat of crystallization of the copolymer. The above results show that no deposition of the copolymer occurred in Examples 7 to 12 in which the temperature at the start of the polymerization was 150 to 165° C.

In Examples 13 to 19, the polymerization reaction was conducted at a temperature of 146 to 167° C. using such raw materials that the total concentration of metal components contained in the trioxane and 1,3-dioxolane was 300 ppb by mass or less, in the presence of both a protonic acid having a molecular weight of 1,000 or less and a salt of the protonic acid which coexisted with each other. The oxymethylene copolymers obtained in Examples 13 to 19 contained 5.0% or less of oxymethylene copolymer having a number average molecular weight of less than 10,000 expressed in terms of polymethyl methacrylate. In contrast, in Comparative Example 15, such raw materials that the total concentration of metal components contained in the trioxane and 1,3-dioxolane was 500 ppb by mass were subjected to bulk polymerization at a temperature of 70 to 103° C. using a polymerization initiator and the formed polymer was allowed to suffer precipitation and solidification as the polymerization proceeded. The oxymethylene copolymer obtained in Comparative Example 15 contained 5.9% of oxymethylene copolymer having a number average molecular weight of less than 10,000 expressed in terms of polymethyl methacrylate.

In Comparative Examples 16 to 22, the polymerization was conducted using such raw materials that the total concentration of metal components contained in the trioxane and 1,3-dioxolane was more than 300 ppb by mass, in the presence of both a protonic acid having a molecular weight of 1,000 or less and a salt of the protonic acid which coexisted with each other. In Comparative Examples 16 to 22, however, no polymerization proceeded. That is, the results of the polymerization conducted in Comparative Examples 16 to 22 were markedly poor, as compared to the results of the polymerization conducted in Examples 13 to 19. The conditions of Examples 13 to 19 were substantially the same as in Comparative Examples 16 to 22 except that the total concentration of metal components contained in the trioxane and 1,3-dioxolane was 300 ppb by mass or less in Examples 13 to 19.

Further, in Examples 13 to 19 in which the temperature at the start of the polymerization was 150 to 165° C., the temperature was lowered by about 4° C. after the start of the polymerization, and then increased to a temperature only 2° C. higher than the temperature at the start of the polymerization. In contrast, in Comparative Example 15 in which the temperature at the start of the polymerization was 70° C., deposition of the copolymer was visually observed through the sight glass after the start of the polymerization, and further the temperature was increased to a temperature not less than 30° C. higher than the temperature at the start of the polymerization due to the heat of crystallization of the copolymer. The above results show that no deposition of the copolymer occurred in Examples 13 to 19 in which the temperature at the start of the polymerization was 150 to 165° C.

Japanese Patent Application No. 2014-261838 filed Dec. 25, 2014 is incorporated herein by reference in its entirety. All documents, patent applications and technical standards mentioned in the present specification are incorporated herein by reference to the same extent as if each individual document, patent application or technical standard is specifically and individually indicated to be incorporated by reference.

The invention claimed is:

1. A method for producing an oxymethylene copolymer, comprising a polymerization step for cationically polymerizing trioxane and a comonomer at a polymerization temperature of from 135 to 300° C. in the presence of at least one salt of a protonic acid having a molecular weight of 1,000 or less, and at least one polymerization initiator selected from the group consisting of protonic acids having a molecular weight of 1,000 or less, protonic acid anhydrides having a molecular weight of 1,000 or less, and protonic acid ester compounds having a molecular weight of 1,000 or less, wherein the trioxane and comonomer used in the polymerization step contain metal components in a total concentration of 300 ppb by mass or less.

2. The method for producing an oxymethylene copolymer according to claim 1, wherein the trioxane and comonomer used in the polymerization step contain four metal components Fe, Cr, Ni, and Mo in a total concentration of 110 ppb by mass or less.

3. The method for producing an oxymethylene copolymer according to claim 1, wherein a production apparatus for the trioxane and comonomer used in the polymerization step and a production apparatus for the oxymethylene copolymer are comprised of a stainless steel member, wherein the method comprises subjecting the stainless steel member to at least one surface treatment selected from the group consisting of a passivation treatment by acid washing, a high-temperature heat treatment, surface polishing, and electropolishing.

4. The method for producing an oxymethylene copolymer according to claim 1, wherein the polymerization step is conducted in the presence of a ketone compound.

5. The method for producing an oxymethylene copolymer according to claim 1, wherein the polymerization initiator is at least one member selected from the group consisting of perchloric acid, a perfluoroalkylsulfonic acid, and anhydrides and ester compounds thereof.

6. The method for producing an oxymethylene copolymer according to claim 1, wherein the salt of protonic acid is a salt formed from a protonic acid and at least one alkali component selected from the group consisting of an alkali metal and a compound thereof, an alkaline earth metal and a compound thereof, ammonia, and an amine compound.

7. The method for producing an oxymethylene copolymer according to claim 1, wherein the salt of protonic acid is at least one member selected from the group consisting of an alkali metal salt and an alkaline earth metal salt.

8. The method for producing an oxymethylene copolymer according to claim 1, wherein the polymerization initiator is present in an amount of from 0.001 ppm by mass to 10% by mass, based on a mass of the trioxane.

9. The method for producing an oxymethylene copolymer according to claim 1, wherein the salt of protonic acid is present in an amount of from 0.001 ppm by mass to 10% by mass, based on a mass of the trioxane.

10. The method for producing an oxymethylene copolymer according to claim 1, wherein a molar ratio of the polymerization initiator to the salt of protonic acid is within the range of from 0.0005 to 100.

11. The method for producing an oxymethylene copolymer according to claim 1, wherein the polymerization temperature is within the range of from 140 to 220° C.

12. The method for producing an oxymethylene copolymer according to claim 1, wherein the polymerization step is conducted in the presence of a molecular weight modifier, wherein the molecular weight modifier is present in an amount of from 0.01 ppm by mass to 10% by mass, based on a mass of the trioxane.

13. The method for producing an oxymethylene copolymer according to claim 1, wherein the polymerization step further comprises the step of diluting all or part of the salt of protonic acid and polymerization initiator with a solvent having a boiling point at 1 atm of 115° C. or lower before addition.

14. The method for producing an oxymethylene copolymer according to claim 1, which further comprises the step of adding a polymerization terminator.

15. The method for producing an oxymethylene copolymer according to claim 14, wherein the polymerization terminator is at least one member selected from the group consisting of an amine compound, a hydroxide of an alkali metal, an alcoholate of an alkali metal, a hydroxide of an alkaline earth metal, and an alcoholate of an alkaline earth metal.

16. The method for producing an oxymethylene copolymer according to claim 14, wherein the polymerization terminator is added in an amount of from 0.1 to 100 molar equivalent, relative to an amount of the at least one polymerization initiator.

17. The method for producing an oxymethylene copolymer according to claim 14, wherein the polymerization step further comprises the step of diluting all or part of the polymerization terminator with a solvent having a boiling point at 1 atm of 115° C. or lower before addition.

18. The method for producing an oxymethylene copolymer according to claim 14, which produces the oxymethylene copolymer continuously using a continuous polymerization apparatus comprising: a static mixer-type continuous polymerizer having a static mixing element in the interior, and a mixer for the polymerization terminator; wherein the static mixer-type continuous polymerizer and the mixer for the polymerization terminator are connected in series.

19. The method for producing an oxymethylene copolymer according to claim 1, which further comprises the step of adding at least one stabilizer selected from the group consisting of a sterically hindered phenol compound and a triazine compound.

20. The method for producing an oxymethylene copolymer according to claim 1, which further comprises the step of putting the oxymethylene copolymer from the polymerization step in at least one degassing apparatus selected from the group consisting of a flash pot, a vented extruder having a single- or twin-screw, and a horizontal high-viscosity liquid degassing apparatus having a one-shaft or two-shaft agitating blade, at a temperature of 130 to 300° C. under a pressure of 0.00001 to 50 MPa, to remove at least part of volatile components and thermally unstable moiety in a form of a gaseous component.

21. The method for producing an oxymethylene copolymer according to claim 20, which further comprises the step of liquefying the gaseous component and recycling part or all of the resultant liquefied component into a raw material trioxane.

22. The method for producing an oxymethylene copolymer according to claim 1, wherein the obtained oxymethylene copolymer has a formate end group content of 5.0 μmol or less per gram of the oxymethylene copolymer.

23. The method for producing an oxymethylene copolymer according to claim 1, wherein the obtained oxymethylene copolymer has a ratio (B/A ratio) of [formaldehyde generation amount (B) of the oxymethylene copolymer after heat treatment at a relative humidity of 98% at 80° C. for 24 hours and at a relative humidity of 11% at 80° C. for 3 hours]/[formaldehyde generation amount (A) of the oxymethylene copolymer after heat treatment at a relative humidity of 11% at 80° C. for 3 hours] of 1.80 or less.

24. The method for producing an oxymethylene copolymer according to claim 1, wherein the oxymethylene copolymer contains 5.0% or less of oxymethylene copolymer having a number average molecular weight of less than 10,000 expressed in terms of polymethyl methacrylate.

* * * * *